US012776058B2

(12) United States Patent
Lakshminarayanan

(10) Patent No.: US 12,776,058 B2
(45) Date of Patent: Oct. 27, 2026

(54) ADAPTIVE INTRAFRAME IMAGE SHIFTING IN DISPLAY SYSTEMS

(71) Applicant: Texas Instruments Incorporated, Dallas, TX (US)

(72) Inventor: Aravind Lakshminarayanan, Frisco, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 81 days.

(21) Appl. No.: 18/355,468

(22) Filed: Jul. 20, 2023

(65) Prior Publication Data

US 2024/0212192 A1 Jun. 27, 2024

Related U.S. Application Data

(60) Provisional application No. 63/476,968, filed on Dec. 23, 2022.

(51) Int. Cl.

*G06T 7/70* (2017.01)
*G06T 7/215* (2017.01)
*G09G 3/00* (2006.01)

(52) U.S. Cl.

CPC ................ *G06T 7/70* (2017.01); *G06T 7/215* (2017.01); *G09G 3/003* (2013.01); *G06T 2207/10016* (2013.01)

(58) Field of Classification Search

CPC ...................... G06T 7/215; G06T 2207/10016
USPC .......................................................... 345/419
See application file for complete search history.

(56) References Cited

U.S. PATENT DOCUMENTS

2018/0068431 A1* 3/2018 Takeda ...................... G06T 7/74
2018/0189574 A1* 7/2018 Brueckner ............. H04N 19/10
2019/0333263 A1* 10/2019 Melkote Krishnaprasad ............. G06F 3/012
2020/0137409 A1* 4/2020 Michail ................ H04N 19/513
2022/0230327 A1* 7/2022 Croxford ................. G06T 1/20

* cited by examiner

*Primary Examiner* — Samantha (Yuehan) Wang
(74) *Attorney, Agent, or Firm* — Michael T. Gabrik; Charles F. Koch

(57) ABSTRACT

In one example, a method includes obtaining, by a control circuit, first and second image frames. The first image frame has first image content to be displayed during a first image frame period. The second image frame has second image content to be displayed during a second image frame period occurring after the first image frame period. The method further includes determining, by the control circuit, a first position and a dimension of an object frame encompassing an object included within the first image content of the first image frame. The method further includes outputting, by the control circuit, a sequence of display signals configured to control the display of the object at the first position, to subsequently display the object at the second position, and to subsequently display at least a portion of the second image content.

20 Claims, 12 Drawing Sheets

ADAPTIVE INTRAFRAME IMAGE SHIFTING IN DISPLAY SYSTEMS

RELATED APPLICATION

This application claims priority to U.S. Provisional Application Ser. No. 63/476,968, entitled "SYSTEM AND METHOD FOR CONTENT ADAPTIVE INTRA-FRAME SHIFT IN DISPLAY SYSTEMS," filed Dec. 23, 2022, which is hereby incorporated by reference herein in its entirety.

BACKGROUND

Near eye display (NED) systems include personal imaging systems that create an image in the field of view of one or both a viewer's eyes. Unlike imaging systems that project an image onto a screen or surface for viewing, certain NED systems project the image from a viewing area on a lens onto the human retina, where the image is perceived to be in front of the viewer. The distance from a viewing pupil on the lens to the viewer's eye may be only a few millimeters. Many NED systems are provided in wearable portable devices, resembling eyeglasses or goggles.

Some NED systems are virtual reality (VR) systems, in which an immersive viewing experience enables the viewer to see only the image projected by the system, while the immersive viewing system blocks light from other sources. VR systems may be used, for example, in gaming, simulators, training systems, or virtual two-dimensional or three-dimensional viewing for movies, games, or video presentations. Certain alternative systems that use NED are transmissive systems, where lenses act as optical combiners. In such alternative systems, the viewer looks through the lens of the NED, and the lens optically combines the images provided by the system with the scene the viewer is observing. Examples are augmented reality (AR) systems. Some NED systems are mixed reality (XR) systems, in which an immersive viewing experience enables the viewer to see only the image projected by the system, while the immersive viewing system also uses cameras to also project virtual renderings of objects in the real world.

SUMMARY

In one example, a method includes obtaining, by a control circuit, first and second image frames. The first image frame has image content to be displayed during a first image frame period. The second image frame has second image content to be displayed during a second image frame period occurring after the first image frame period. The method further includes determining, by the control circuit, a first position within the first image frame for a first object of a plurality of objects included within the first image content of the first image frame. The method further includes determining, by the control circuit, a motion vector for the first object. The method further includes determining, by the control circuit, a second position of the first object using the determined motion vector, the second position being different from the first position. The method further includes outputting, by the control circuit, output signals configured to control the display of the first object at the second position before displaying the second image content during the second image frame.

In another example, a system includes a video receiver, a control circuit coupled to the video receiver, and a spatial light modulator coupled to the control circuit. The video receiver is configured to receive video input. The control circuit is configured to obtain first and second image frames from the video input. The first image frame has first image content to be displayed during a first image frame period. The second image frame has second image content to be displayed during a second image frame period occurring after the first image frame period. The control circuit is further configured to determine a first position within the first image frame for a first object of a plurality of objects included within the first image content of the first image frame. The control circuit is further configured to determine a motion vector for the first object. The control circuit is further configured to determine a second position of the first object using the determined motion vector, the second position being different from the first position. The control circuit is further configured to output display signals configured to control the display of the first object at the second position before displaying the second image content during the second image frame. The spatial light modulator is configured to spatially modulate a light beam responsive to the display signals outputted by the control circuit.

In another example, a method includes obtaining, by a control circuit, first and second image frames. The first image frame has first image content to be displayed during a first image frame period. The second image frame has second image content to be displayed during a second image frame period occurring after the first image frame period. The method further includes determining, by the control circuit, a first position and a dimension of an object frame encompassing an object included within the first image content of the first image frame. The method further includes outputting, by the control circuit, a sequence of display signals configured to control the display of the object at the first position, to subsequently display the object at the second position, and to subsequently display at least a portion of the second image content.

BRIEF DESCRIPTION OF THE DRAWINGS

The same reference numbers or other reference designators are used in the drawings to designate the same or similar (functionally and/or structurally) features. The figures are not necessarily drawn to scale.

DETAILED DESCRIPTION

Figure 1:
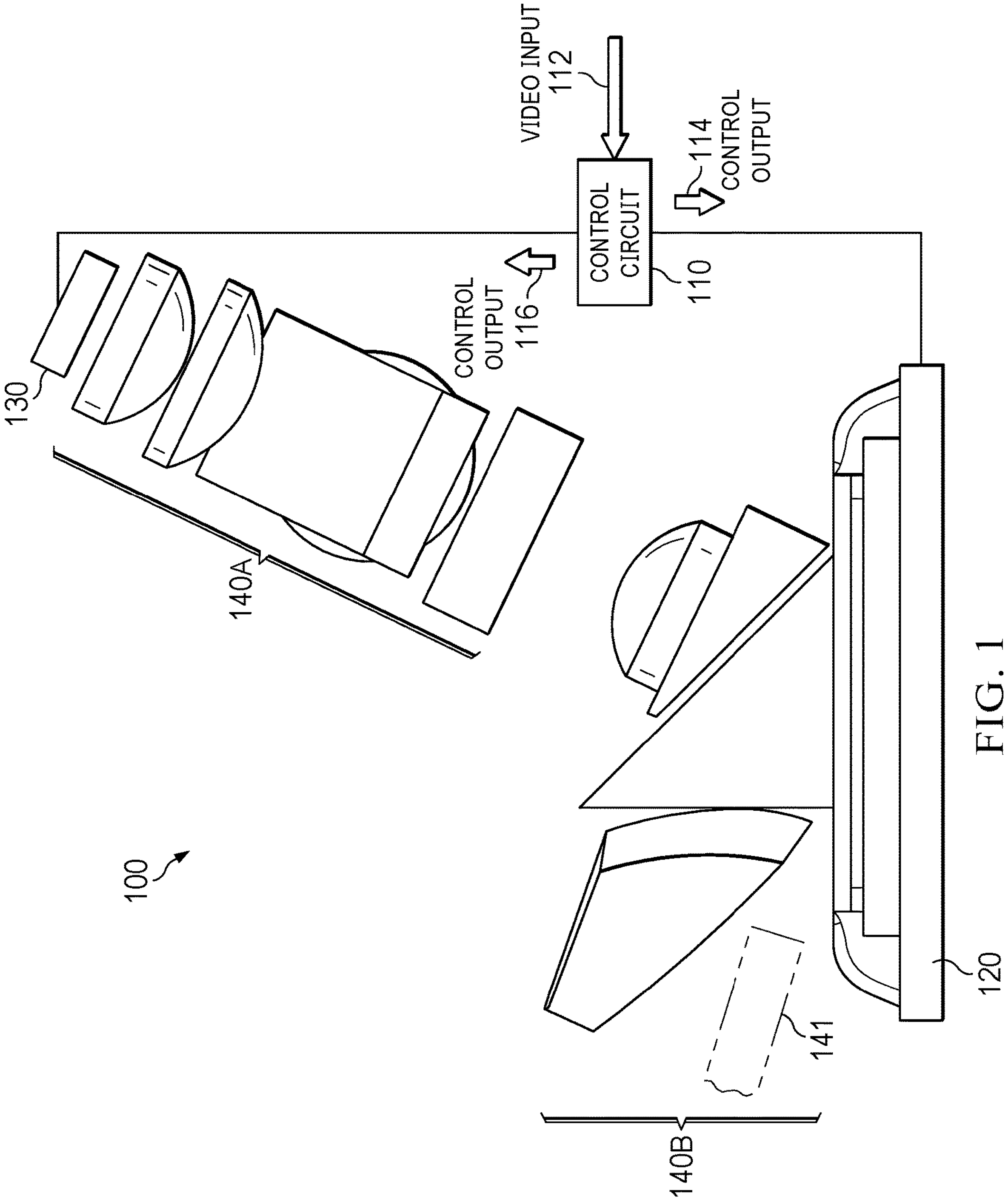
FIG. 1 is simplified block diagram of a projection subsystem including a control circuit.

FIG. 1 is simplified block diagram of a projection subsystem 100. In some systems, projection subsystem may be configured to be housed within a NED system, such as, for example, the NED system 200 of FIG. 2. However, projection subsystem may be configured for use in any suitable display system. Projection subsystem 100 includes a control circuit 110, a spatial light modulator (SLM) 120, a light source 130, and optical elements 140A-140B. Projection subsystem 100 operates to provide display information from a video source providing video input.

Among other technical advantages described herein, projection subsystem 100 may be configured to project static virtual objects that are perceived by the viewer to remain at a fixed position within the field of view, independent of any movement of the viewer. For example, projection subsystem 100 may render a display of a battery icon that appears to remain at a fixed position within a viewer's field of view even, for example, while the viewer rotates its head when traveling within a vehicle. Projection subsystem 100 also may be configured to project moving virtual objects (referred to herein as "dynamic objects") with enhanced realism, such that they are perceived by the viewer to realistically move along respective motion vectors, independent of any motion of the viewer.

To enhance the realism of the perceived independent motion of dynamic objects, projection subsystem 100 may be configured to derive shifted positions of dynamic objects, such that, when displayed in appropriate sequence with dynamic object data received from a source, the motion of dynamic objects may be perceived by the viewer to be more realistic and independent of any movement of the viewer. For example, a data source may provide projection subsystem 100 with a sequence of positional data for a dynamic object; and projection subsystem 100 may be configured to derive one or more intermediate positions for the dynamic object, each derived position being located between a respective two positions of the provided positional data for the dynamic object. The display of such derived positional data may be perceived by the viewer to smooth the motion of a dynamic object and hence cause its movement to appear more realistic to the viewer. Projection subsystem 100 may also be configured to adaptively derive certain dynamic object positions in real-time, responsive to movement(s) of a viewer, such as the movement of the viewer's pupil, the viewer's head position, or the body of the viewer in general (e.g., the viewer may be traveling in a vehicle).

Control circuit 110 refers to any suitable circuitry configured to receive video output 112 and output corresponding control outputs 114 and 116 formatted to be applied to inputs of SLM 120 and light source 130, respectively. Control circuit 110 may include various hardware and software subcomponents, as explained further with reference to FIG. 3.

SLM 120 refers to any suitable optical device that imposes some form of spatially varying modulation on a beam of light. SLM 120 includes an array of individually addressable and controllable pixel elements that modulate light according to video input data streams. Various optical devices can implement spatial light modulation, such as one or more digital micromirror devices (DMD), liquid crystal displays (LCD), liquid crystal on silicon (LCoS), micro-light-emitting-diode (microLED) and so forth.

Projection subsystem 100 may be adapted for use with one or more SLM(s) 120. In some systems, projection subsystem 100 may further be adapted, or may alternatively be adapted, for use with a phase light modulator (PLM) that imposes some form of phase varying modulation of a beam of light. Various optical devices can implement phase light modulation, such those based on DMD, LCD, LCOS, microLED, or other technologies capable of phase light modulation and/or spatial light modulation.

Control circuit 110 may determine the relative positional changes or motion vectors of virtual objects projected by projection subsystem 100. Control circuit 110 may adaptively determine respective motion vectors for various virtual objects to be projected within a given image frame. The motion vectors may be based on, for example, respective movement vectors of the projected objects themselves, any directional change of the gaze of the viewer's pupil(s), or any movement vector of the viewer's head or entire body.

In some AR systems, the field of view at any point in time may be perceived as one or more image frames projected by projection subsystem 100 that are optically combined with the real-world scene also within the viewer's field of view. In some systems capable of rendering three-dimensional content, multiple image frames may be used simultaneously to render projections to both of a viewer's eyes in a manner that produces a three-dimensional effect. In some VR or XR systems, the field of view at any point in time may be one or more image frames projected by projection subsystem 100, in which at least part of the image frame(s) may contain virtual renderings of objects in the real world.

Certain motion vectors determined by control circuit 110 may be explained in the context of an example AR system. If a viewer is a passenger in a moving vehicle, for example, control circuit 110 may be configured to cause projection subsystem 100 to project a moving virtual object in the foreground, such as, for example, an image of a person or a drone rapidly moving from right to left across the viewer's field of view (e.g., object 404 of FIG. 4). A virtual object having a motion vector other than zero relative to a given image frame is referred to herein as being dynamic. The motion vector of a dynamic object may be shifted relative to changes in the viewer's gaze or head position, thereby making it appear to the viewer as if the dynamic object is moving independently and realistically in the real world. Thus, if the dynamic object is being projected as moving left to right while the viewer's gaze shifts left to right, the rate at which the dynamic object is projected as traversing the field of view may be perceived by the viewer to have slowed or stopped.

Figure 4:
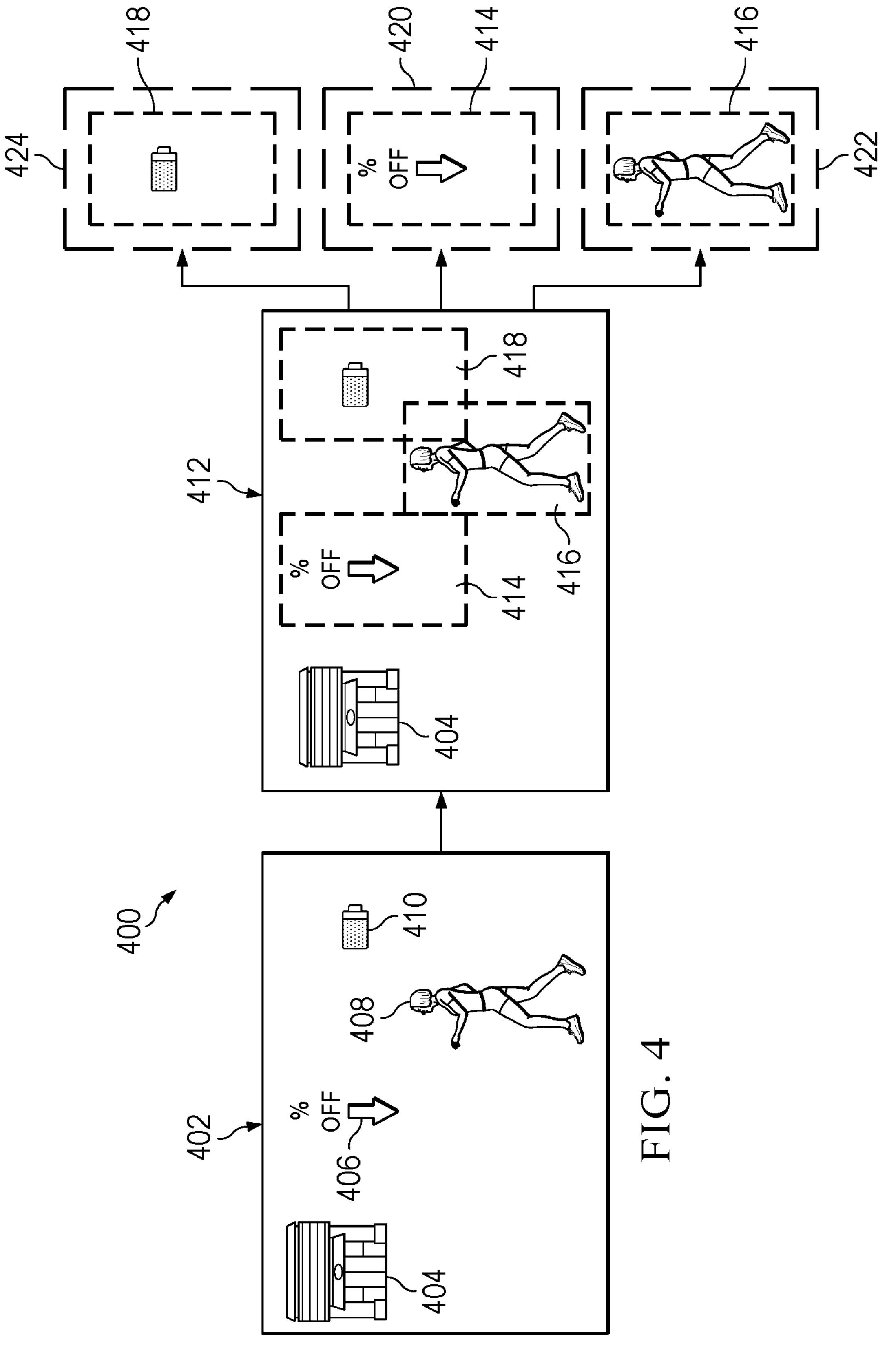
FIG. 4 is a simplified block diagram illustrating example processes for sub-image splitting performed by the control circuit of FIG. 1.

Control circuit 110 may also be configured to cause projection subsystem 100 to project one or more virtual objects that are perceived by the viewer to be at a fixed position relative to certain marked positions in the real world. For example, control circuit 110 may cause a virtual advertisement object to be projected within the field of view, such that the object is perceived by the viewer to be fixed in its position or anchored relative to a non-moving feature in the field of view. As shown in FIG. 4, for example, object 406 may be a virtual image having a proximate real-world café building 405 as an anchor point. If any movement (including pupil gaze) of the viewer causes the anchor point to shift position within the field of view, control circuit 110 may perform real-time processing to appropriately shift the position of object 406, such that the object appears to be continually anchored in its position relative to the anchor point. The positional anchoring of a virtual object to a physical object in the real world may help create the perception of an association between those objects. Such a perceived association may provide numerous technical advantages including, for example, in the context of advertisements, object descriptions, object classifications, and so forth.

Object 406 in this example may also be classified as dynamic in that it may change position from one image frame to another (e.g., responsive to a determination that the real world seen through the field of view has changed). If any movement of the viewer (including pupil gaze) causes the anchor point to leave the field of view, control circuit 110 may also cause object 406 to be removed from the field of view or to newly display replacement, unanchored object.

Control circuit 110 may also be configured to cause projection subsystem 100 to project a virtual object at one static position relative to the field of view. For example, a virtual object indicating the charge level of a battery may be projected at a static position in the upper-right hand corner of the field of view, as shown by object 410 of FIG. 4. A virtual object that remains in the same position within the field of view, regardless of any change in the viewer's directional gaze, head position, or entire body location, is referred to herein as being static. Control circuit 110 may control the position of any static virtual object, such that the static virtual object is perceived by the viewer to remain in the same location within the field of view, regardless of the directional gaze of the viewer changes or whether the viewer's head or entire body is motion.

After control circuit 110 determines the appropriate position for all virtual objects to be projected, control circuit 110 may send control signals causing projection subsystem 100 to project those objects (e.g., both the advertising and battery-level objects), such that the viewer perceives them to all be simultaneously within the same field of view at the appropriate position. For example, control circuit 110 may cause the projection subsystem 100 to project a series of image frames appropriately positioning any suitable combination or number of dynamic objects or static objects. In the above example scenario involving two dynamic objects and one static object, for example, control circuit 110 may cause projection subsystem to 100 appropriate position those objects within a series of image frames, even while the viewer's gaze, head, or body is in motion, such that the first dynamic object appears to be anchored to an anchor point in the real world, the second dynamic object appears to be in motion relative to the real world, and the static object that appears to the viewer to remain at a fixed location within the field of view.

Optical elements 140A-140B refer to any suitable optical device(s) capable of receiving and transmitting incident light beams in a manner that concentrates, diverges, refracts, diffracts, redirects, reshapes, integrates, or reflects the incident light beams. In some systems, optical elements 140A-140B collectively optically couple light source 130 to SLM 120. For example, optical elements 140A-140B may be configured to concentrate light beams emitted by light source 130 and direct focused light beams toward SLM 120. For example, optical elements 140B may be configured to receive light beams spatially modulated by spatial light modulator and concentrate, diverge, refracts, diffracts, redirects, reshapes, integrate, or reflect the received spatially modulated light beams toward a waveguide 141. In some systems, the waveguide 141 may be configured to receive the spatially modulated light beams and to transmit the same to the retina of a viewer wearing of an NED system, such as the NED system 200 illustrated in FIG. 2.

In this description, elements that are optically coupled have an optical connection between the elements, but various intervening optical components can exist between elements that are optically coupled. Similarly, in this description, when the term coupled describes relationships between elements, it is not limited to connected or directly connected, but may also include connections made with intervening elements, and additional elements and various connections may exist between any elements that are coupled.

In some systems, the light illuminating SLM 120 is tinged with a color, for example by using either a white light source and some type of color filter or by using one or more light sources that each provide a respective colored light beam. This enables some display systems using spatial light modulation to display colored images.

In this example, SLM 120 is illustrated as being optically coupled to light source 130 at an angle that facilitates selective reflection to spatially modulate light beams. A DMD is an example device capable of such reflective spatial modulation. A DMD is an optical micro-electrical-mechanical system (MEMS) that contains an array of highly reflective aluminum micromirrors, each corresponding to at least one display pixel. Each micromirror may be individually addressed in either an on or off state, where an on state of a given micromirror causes light beams spatially corresponding to that micromirror to be projected onto a pupil of a viewer wearing a NED system containing the projection subsystem 100. Gray scale may be created by causing the micromirrors to oscillate some preset number of times within a timeframe corresponding to the display of a single image. A full color gamut may be created by time multiplexing the individual display of three or more primary colors (e.g., red, green, and blue).

In other systems, SLM 120 may output modulated light beams using one or more devices different from the general DMD description above. For example, SLM 120 may output modulated light beams by selective redirection using reflective LCOS display technology. In an LCOS display, a complementary metal-oxide semiconductor (CMOS) chip may be used to control the voltage on square reflective aluminum electrodes below the chip surface, each controlling one pixel. For example, a chip with XGA resolution will have 1024×768 plates, each with an independently addressable voltage. Typical cells are about 1-3 centimeters square and about 2 mm thick, with pixel pitch as small as 2.79 μm. A common voltage for all the pixels is supplied by a transparent conductive layer.

In addition, SLM 120 may selectively transmit incident light beams using an LCD crystal panel or an interferometric modulator. Some LCD projectors use transmissive LCD, in which an LCD panel functions as a spatial light modulator by selectively allowing light beams to pass through the LCD panel depending on the orientation of liquid crystal molecules at each LCD pixel. Each pixel of an LCD consists of a layer of molecules aligned between two transparent electrodes and two polarizing filters. Without the liquid crystal between the polarizing filters, light passing through the first filter would be blocked by the second polarizer. The orientation of each LCD pixel can be “switched” on or off by selectively applying an electrical field.

The position of light source 130 or optical elements 140A may be altered, in some systems, to accommodate an alternative SLM 120 that modulates light beams differently from what is representatively shown in FIG. 1.

Figure 2:
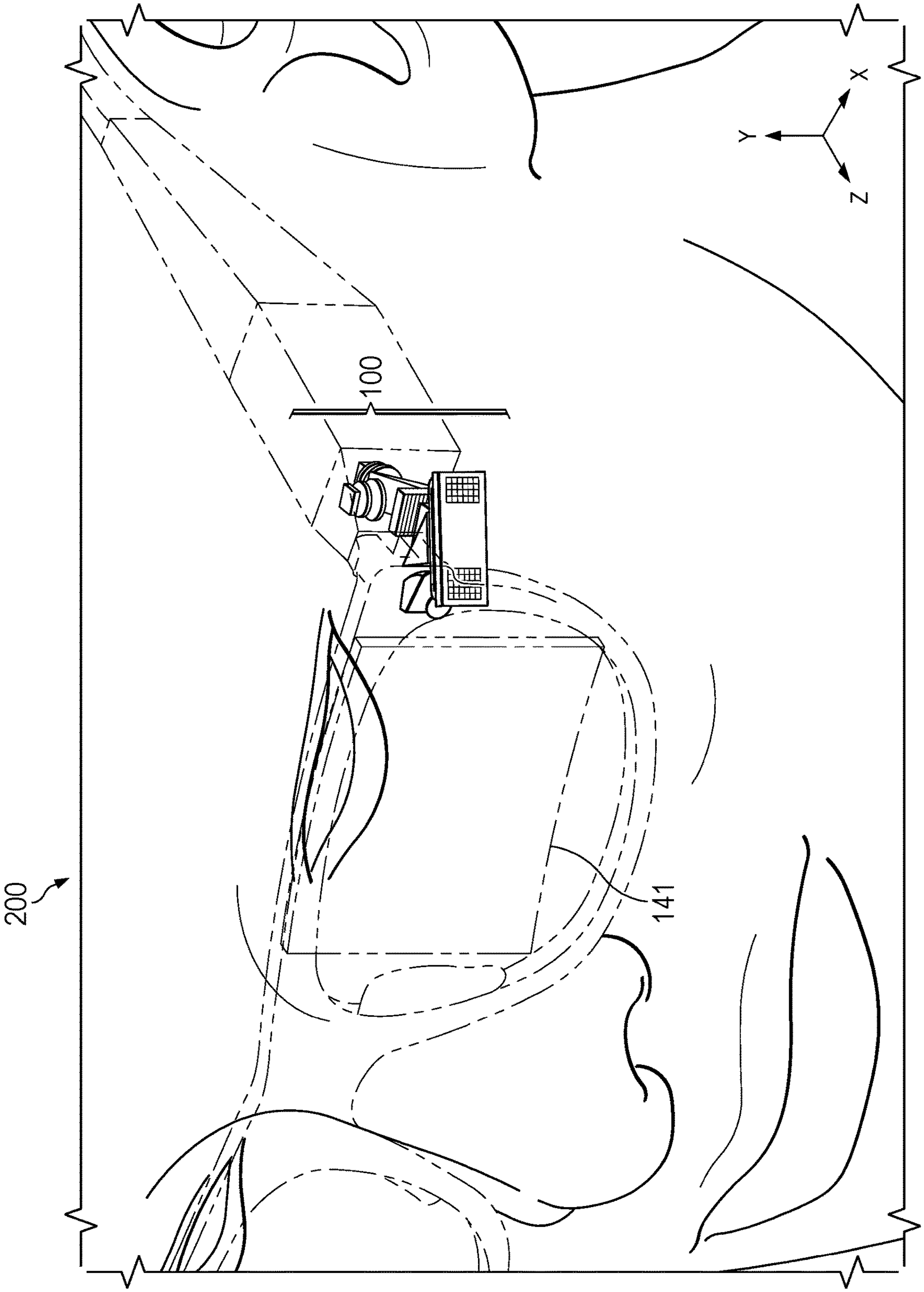
FIG. 2 illustrates an NED system housing the projection subsystem of FIG. 1.

FIG. 2 illustrates an NED system 200 housing the projection subsystem 100 of FIG. 1. In this example, projection subsystem 100 is mounted to a wearable headset or eye glass(es) of NED system 200. In some systems, a waveguide 141 (or pair of waveguides) may have a transmissive lens positioned in proximity to a viewer’s eye(s). A waveguide 141 may operate to direct light beams toward a viewer’s retina. The light beams directed by a waveguide 141 may contain display information, as received from the optical component(s) positioned in the light path between the lens and the projection subsystem. In certain AR applications, from the perspective of the viewer, the display information provided by NED system 200 is optically combined with the scene being viewed through a waveguide 141 may be perceived as virtual objects in the distance.

A variety of visual information, cues, or aids may be displayed by NED system 200. For example, notifications can be displayed and viewed along with a scene being observed. Examples of such notifications include social media messages, text including navigation information, weather, traffic, historical or tourism information about an object or place, retail offers such as sales or advertising related to a store or place near to or being viewed by a viewer, stock quotes, sports scores or other context driven notifications or information. Some systems may enable interactive gaming, such as scavenger hunts or games involving finding virtual objects at a location, or games scoring the viewer’s ability to find a target place or object. Some systems may enable battle simulations in either a gaming or military training context, in which a virtual object, such as a drone or a person, is perceived as entering a field of view at a certain vector and as continuing to realistically and independently travel through the field of view even while the viewer adjusts its gaze. Some AR systems provide a full field of view display that is always in the view of the viewer, while other AR systems may provide a small display provided at a portion of the view that the viewer must specifically look at to see, such as smart glasses.

NED system 200 can include network connections, such as cellular connections, Wi-Fi connections, Bluetooth connections. In addition, NED system 200 can be coupled to another device including such connections, such as a smartphone, tablet, portable web browser, video player, or laptop computer.

In some systems, a viewer wears a headset or eyeglass(es) in a manner similar to sunglasses, eyeglasses, or monocle, and NED system 200 displays information that augments the real visual environment observed by the viewer while wearing the device. In other systems, such as an automotive or aerospace heads-up displays (HUD), the viewer looks into the NED system 200, and the imaging system adds images to the scene in front of the viewer. In this way, the viewer can observe a scene while receiving additional information at the same time, such as vehicle speed, fuel gauges, system messages, and similar data.

Figure 3:
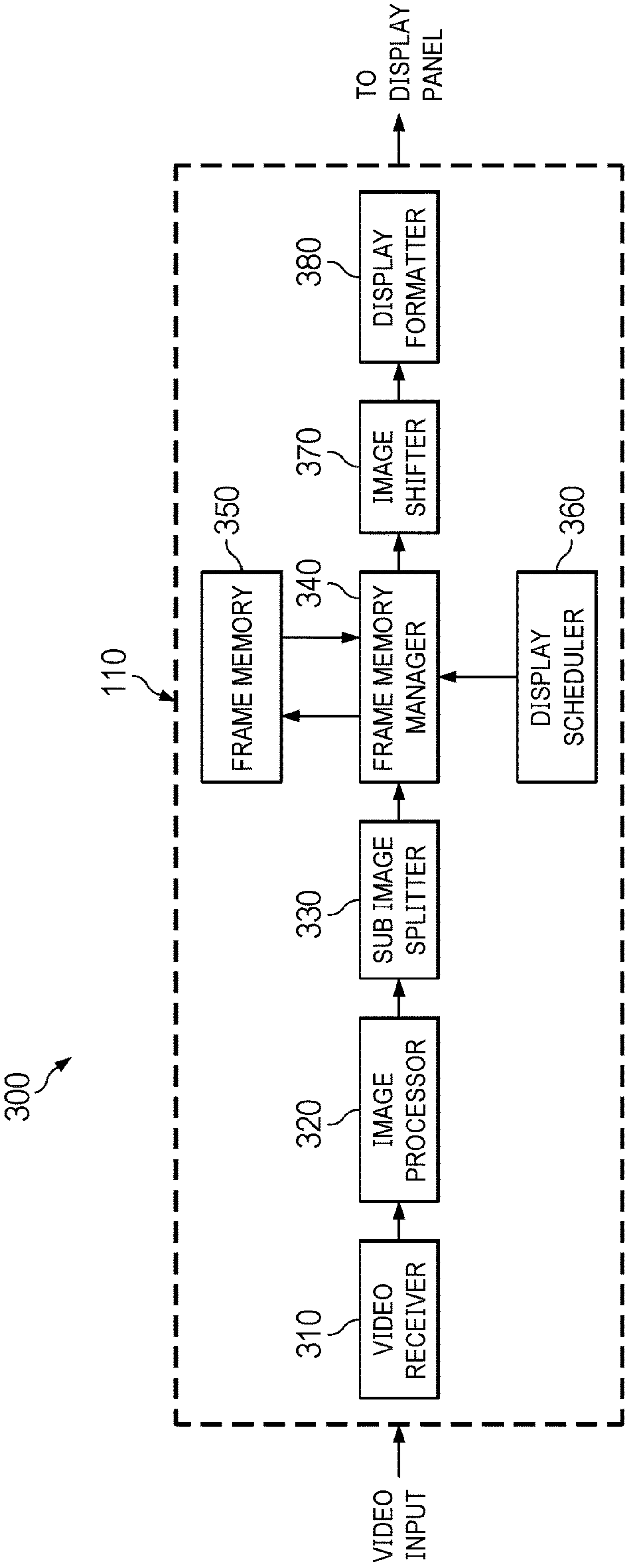
FIG. 3 is a simplified block diagram illustrating example subcomponents of the control circuit of FIG. 1.

FIG. 3 is a simplified block diagram 300 illustrating example subcomponent circuitry of control circuit 110. In this example, the subcomponents include a video receiver 310, an image processor 320, a sub-image splitter 330, a frame memory manager 340, a display scheduler 360, a sub-image shifter 370, and a display formatter 380. In some systems, video receiver 310, image processor 320, sub-image splitter 330, frame memory manager 340, display scheduler 360, sub-image shifter 370, or display formatter 380 may each include or may be included within one or more controllers.

Video receiver 310 refers to any suitable circuitry configured to receive video input. For example, the video input may be received wirelessly or over a wired connection.

Image processor 320 refers to any suitable circuitry configured to process video input to output corresponding image frames. Each image frame may correspond to a full-array image to be displayed during an image frame period. In some systems implementing a colored display, each image frame may be subdivided into multiple color-specific image subframes (e.g., red, green, and blue).

Sub-image splitter 330 refers to any suitable circuitry configured to split a given image frame or image subframe into one or more sub-images. Example operations of sub-image splitting are described further herein with reference to FIG. 4.

Frame memory manager 340 refers to any suitable circuitry configured to control the reading and writing of image data to and from frame memory 350. Example corresponding operations are described further herein with reference to FIGS. 9-13.

Frame memory 350 refers to any suitable circuitry configured to store image data that is to be displayed using SLM 120. For example, the image data may be stored in memory cells of frame memory.

Display scheduler 360 refers to any suitable circuitry configured to control the scheduling of when certain image content is to be displayed. Example scheduling schemes that may be used by display scheduler are described further herein with reference to FIGS. 9-13.

Sub-image shifter 370 refers to any suitable circuitry configured to control the position shifting of sub-images (also referred to herein as objects or object frames) to be displayed. The processing of control circuit 110 to effect the relative image shifting may be explained in the context of video input divided into multiple image frames. Each image frame may correspond to a full-array image to be projected by projection subsystem 100 during an image frame period. In some systems implementing a colored display, each image frame may be subdivided into multiple color-specific image subframes (e.g., red, green, and blue).

In some examples, the motion of virtual objects within an image frame may be perceived by the viewer to be smoother and hence more realistic if an image frame period is temporally divided into image frame subperiods of equal duration, referred to herein as object frames. To achieve this smoothing effect, control circuit 110 may be configured to encode different objects with different respective vectors of movement. For the battery-level object described above, for example, there may be just one position in the movement vector, which causes the battery-level object to appear stationary in the field of view. For the advertisement object described above, there may be a number of positional shifts applied within the same image frame period or applied during temporally adjacent image frame periods. For projected objects that are perceived to be moving more quickly across a field of view, an increased number of positional shifts may be applied (e.g., seven, eight, nine, ten, etc.). Additional detail concerning operations performed by sub-image shifter 370 is explained further herein with reference to FIGS. 1, 5 and 9-13.

Display formatter 380 refers to any suitable circuitry configured to format the output of sub-image shifter in order to produce output signals formatted to be applied to input interfaces of by SLM 120. For example, display formatter 380 may divide image frames or object frames into multiple bit planes. Each bit plane represents an image arrangement of one-bit extracted from the full array of pixels in the input image frame. In some systems implementing a colored display, a number of bit planes may be applied during the image frame period for each color, which may enable modulating color brightness or intensity for each pixel during the image frame period. The output signals provided by display formatter 380 may be further configured to control sequential display of a plurality of objects included within a given image frame, where each object is to be displayed in a respective one of several object frame periods, the object frame periods sequentially diving up between them the full duration of an image frame period.

FIG. 4 is a simplified block diagram 400 illustrating example processes, performed by control circuit 110, for splitting an image frame 412 into object frames. The four edges of block 402 represents the boundaries of a field of view perceived by a viewer as a result of an image frame being projected. The simplified field of view includes at least four representative objects 404, 406, 408, and 410.

In the context of an AR system, object 404 may be a real-world structure (e.g., a café) or natural feature (e.g., a mountain or other landmark) naturally visible to the viewer. In an alternative context of either a VR or XR system, object 404 may be a virtual image representing a structure or natural feature in the real world.

Objects 406, 408, and 410 may each be virtual objects projected by projection subsystem 100. In this example, object 406 is in the background, object 408 is in the foreground, and object 410 is in the upper-right corner. As explained above, object 406 may be a virtual advertisement image intended to be anchored in its position relative to a fixed position in the real world (e.g., object 404), as explained with reference to FIG. 1. If any movement (including pupil gaze) of the viewer causes the anchor point to shift position within the field of view, control circuit 110 may perform real-time processing to appropriately shift the position of object 406, such that object 406 appears to be continually anchored in its position relative to its anchor point.

Object 408 may be a virtual image having a motion vector in a direction from right to left relative to the field of view of block 402. For example, object 408 may be an image of a person running, or a drone flying, in the direction indicated, as explained further with reference to FIG. 1.

Object 410 may be a virtual icon representing the charge level of a battery, for example.

The four sides of image frame 412 collectively represent the edges of an image frame corresponding to the field of view shown in block 402. In this example, object 404 of block 402 does not appear within the illustrated image frame 412. This is because, in this example, object 404 represents a real-world object in the background of the field of view perceived by the viewer, whereas image frame 412 contains only virtual objects of an image frame to be projected by projection subsystem 100.

In some systems, control circuit 110 may analyze virtual objects within an image frame and determine an object frame sufficient to encompass the largest of the virtual objects included within a given image frame. The size of the determined object frame may be used by the control circuit to determine an equal duration of time to be applied to each object frame period of a plurality of object frame periods collectively dividing up an image frame period. For example, control circuit 110 may determine the smallest rectangle (e.g., in terms of total pixel count) sufficient to enclose the largest virtual object within the image frame. The smallest rectangle sufficient to enclose the largest virtual object within a given image frame is referred to herein as the object frame for that image frame. In this example, object 408 is the largest of the three virtual images represented by objects 406, 408, and 410. Accordingly, the dimensions of rectangle 416 is deemed the object frame dimensions for the image frame—i.e., in the illustrated example, rectangle 416 is the smallest rectangle sufficient to enclose the largest of the objects 406, 408, and 410 within image frame 412.

In some systems, control circuit 110 may apply a pixel buffer that increases the dimensions of the object frame for a given image frame. For example, the determined object frame may be enlarged by a predetermined number of pixels in terms of height and width. The applied pixel buffer may enable positioning of the object frame relative to the largest of virtual objects such that at least a threshold number of buffer pixels (e.g., a number selected within the range of 1 to 32 pixels) separates the outermost edges of the largest virtual object from all sides of the buffered object frame.

Once the template dimensions for the object frame is determined, control circuit 110 may determine the location for similar sized object frames encompassing each one of the of virtual objects within the same image frame. FIG. 4 illustrates example positioning of buffered object frames 420, 422, and 424 relative to rectangles 414, 416, and 418.

While rectangle 418 is shown to be at the outermost edge of image frame 412, in some systems, there may be a buffer zone of pixels (e.g., a buffer zone 32 pixels wide) extending around all sides of the entire image frame. Such a buffer zone may be used, for example, to allow for an object frame to be positioned relative to its subject in a manner that extends beyond the image frame corresponding to the field of view. Use of a buffer zone around the entire image frame may also facilitate control circuit 110 processing the shifting of an entire image frame responsive to a determined shift in the view's gaze, head position, or geolocation.

Once the appropriate encompassing rectangles have been determined for each virtual object within an image frame, control circuit 110 may determine whether to mark each object as either static or dynamic relative to its position within the display frame. As explained with reference to FIG. 1, a virtual object having a motion vector other than zero relative to a given image frame is referred to herein as being dynamic. A virtual object that remains in the same fixed position within the field of view, regardless of any change in the viewer's directional gaze, head position, or entire body location, is referred to herein as being static.

In some instances, the marking determination may include control circuit 110 determining whether a given object is already marked with either a static or dynamic classification. Such prior marking may have occurred, for example, as a result of control circuit 110 previously analyzing one or more image frames derived from video input received by video receiver 310.

If a given object is not already marked as static or dynamic, the marking determination for a given virtual object of an image frame may include control circuit 110 determining whether the object has a motion vector greater than zero. The motion vector of a given object may be determined based on any of a variety of factors. For example, control circuit 110 may determine a given virtual object has a non-zero motion vector by comparing multiple image frames to each other. As explained further with reference to FIG. 1, determining the motion vector may include determining whether and to what degree the viewer's gaze, head position, entire body has moved. Detection of such real-world viewer movement may cause control circuit 110 to apply a non-zero motion vector to the virtual object that shifts the position of the virtual object within an image frame relative to the detected real-world movement of the viewer. Additionally, or alternatively, the motion vector for a given virtual object may be at least partially encoded within video input data itself. If a virtual object is an image of person running or a drone, for example, the object may be encoded within the video input as to be perceived, for a certain time period, as traveling in a straight line at a fixed velocity between two locational points.

In certain systems, a series of projectable image frames may be derived from video input data at a certain maximum rate. Accordingly, each image frame may be allotted a certain time window, referred to herein as an image frame period, for processing corresponding data (including any virtual objects within an image frame) to produce display output formatted to be applied to input interfaces of SLM 120. The maximum number of image frames that control circuit 110 may be capable of processing per second is referred to herein as the image frame rate. Because the object frames described herein each represent a relatively small fraction (in terms of total number of pixels) of the overall image frame in which they are contained, control circuit 110 may be capable of processing object frames of a given image frame at a maximum object frame rate that exceeds the maximum image frame rate.

The maximum object frame rate may itself vary from one image frame to another depending on the variable size of the determined object frame for a given image frame. Thus, control circuit 110 may be configured to determine the maximum object frame rate that may be applied to a given image frame based, at least in part, on the variable size of the object frame being used.

Once control circuit 110 has determined the maximum object frame rate that can be supported for the object frame size of a given image frame, control circuit 110 may be configured to provide control output 114 or 116 that causes projection subsystem 100 to project the image content of the determined object frames. In some systems, control circuit 110 may cause all the object frames determined for a given image frame to be projected one at a time, in a sequential manner (e.g., using pulse width modulation timing), during the corresponding image frame period. In some systems, control circuit 110 may cause multiple object frames determined for a given image frame to be projected at the same time, in a spatially-interleaved manner, during the corresponding image frame period. Example spatially-interleaved pixel patterns that may be applied are explained further with reference to FIGS. 6-8.

Figure 5:
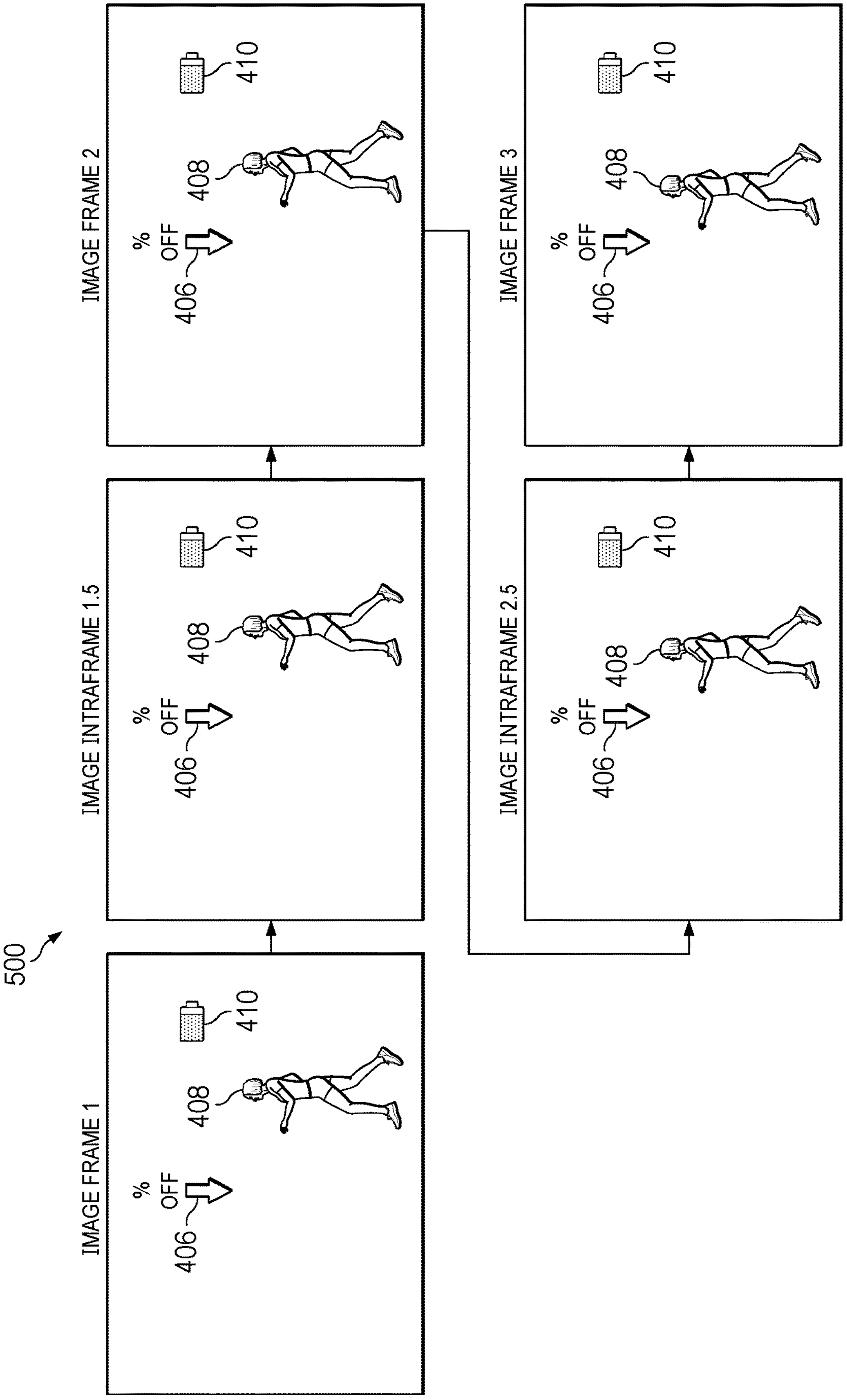
FIG. 5 is a simplified block diagram illustrating an example sequence of image frames processed by the control circuit of FIG. 1.

FIG. 5 is a simplified block diagram 500 illustrating an example sequence of image frames processed by control circuit 110. This example involves three image frames labeled as Image Frame 1, Image Frame 2, and Image Frame 3 and two shifted image intraframes labeled as Image Intraframe 1.5 and image intraframe 2.5. Image frames 1, 2 and 3 may be provided by image processor 320 based at least in part on video input received by video receiver 310, as explained with reference to FIG. 3. Image Intraframes 1.5 and 2.5 may have respective displayable content that is mathematically derived in a manner that smooths the motion of any image content from one Image Frame to another, as also explained further with reference to FIG. 3. For example, Image Intraframe 1.5 may be derived based on a comparison of image content of Image Frames 1 and 2; and Image Intraframe 2.5 may be derived based on a comparison of image content of Image frames 2 and 3.

The image content of Image Frames 1, 2 and 3 and Image Intraframes 1.5 and 2.5 includes three objects described previously with reference to FIG. 4: (1) a first dynamic object 406 (e.g., an advertisement) anchored in its position to a real-world anchor point; (2) a second dynamic object 408 in the foreground (e.g., a person or drone) rapidly moving right to left; and (3) a static object 410 locked in its position in the upper right-hand corner (e.g., a battery icon). A sub-image shifter 370 may be adapted to derive the positions of objects 406, 408 and 410 within Image Frames 1, 2, or 3, or within Image Intraframes 1.5 or 2.5, as explained further with reference to FIG. 3. For example, the derivation performed by sub-image shifter 370 may be based at least in part on a determined motion vector for each object 406, 408, and 410. In some systems, the motion vector may be encoded as part of the image frame data, or it may be derived by a comparison of any shift in object position from one image to another. A relative adjustment to the motion vector of a given object may also be calculated responsive to detected motion in the gaze, head position, or body position of the viewer.

In this example, object 406 is anchored to a real-world position and yet is illustrated (by a frame-to-frame comparison) as gradually moving across the field of view from right to left at a relatively constant speed. Such frame-to-frame movement of anchored object 406 may be the result of control circuit 110 adjusting the position of object 406 within the field of view based on detection of the viewer traveling at a rapid velocity (e.g., the viewer may be a passenger in a vehicle).

In this example, object 408 appears to the viewer to move more rapidly in the foreground from right to left, consistent with the relative movement of object 406 anchored in the background. Object 410 (e.g., a static battery icon) remains fixed in its position for each one of the five example frames shown.

Control circuit 110 may apply various intraframe control schemes to render multiple virtual objects in a manner that soothes any motion of objects marked as being dynamic, while maintaining the brightness of other objects marked as being static. For example, control circuit 110 may temporally divide image frames periods into multiple object frame periods and derive intraframe shift amounts of any dynamic objects from one image frame to another. Such time divisions may facilitate smoothing the motion of dynamic objects from the perspective of a viewer, thereby making the objects appear to be more realistic. Such time division may also facilitate adaptively modifying the position of dynamic objects within a field of view responsive to detected changes in the viewer's gaze, head position, or body geolocation. Example timing schemes that may be applied to divide an image frame period into multiple object frame periods for use in displaying virtual objects are described further with reference to FIGS. 9-12.

In some systems, an image frame may be spatially divided in an interleaved manner, such that certain pixels of an image frame are assigned to displaying one object and other pixels of the same image frame are assigned to displaying a different object. The video input may itself contain spatially interleaved patterns of objects. In some systems, control circuit 110 may apply spatially-interleaved patterns for use in displaying more than one object during the same object frame, while individually controlling the relative positional shifting of each object within a field of view. Examples of such interleaved spatial subdivision of an image frame is described further with reference to FIGS. 6-8.

Figure 6:
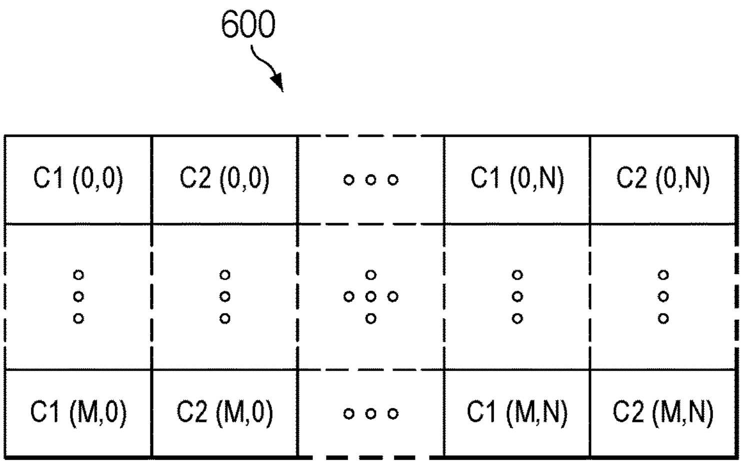
FIG. 6 is a portion of a pixel matrix illustrating an example configuration encoding an array of pixels with two distinct objects arranged in a spatially-interleaved pattern.

FIG. 6 is a portion of a pixel matrix 600 illustrating an example configuration that may be used by control circuit 110 to encode an array of pixels with two distinct objects arranged in a spatially-interleaved pattern. Such encoding may be used, for example, to simultaneously display multiple objects within an image frame at their proper respective locations. In this example, pixels corresponding to a first object are identified as "C1" followed by two x-y coordinate identifiers (e.g., "C1(0,0)"). Pixels corresponding to a second object are identified as "C2" followed by two x-y coordinate identifiers (e.g., "C2(0,0)"). As shown in FIG. 6, C1(0,0) is shown in the upper lefthand corner of the illustrated array, at a location to the left of C2(0,0). Thus, in this example, every other pixel in an array of pixels may be used to display either one of two distinct objects. If a given object is shaped or positioned such that it is not to be displayed at a given pixel location, the respective pixel may be deemed null or black, such that there is no projection for that object at that particular location.

Figure 7:
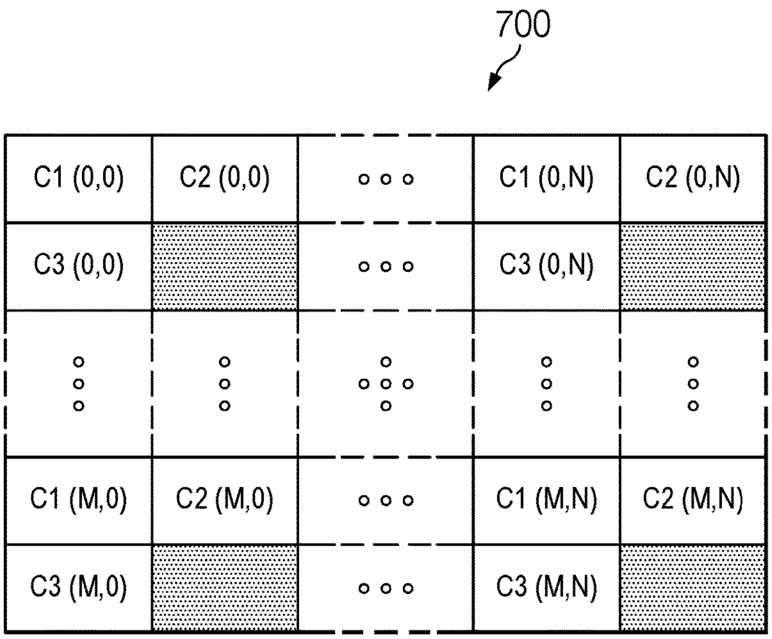
FIG. 7 is a portion of a pixel matrix illustrating an example configuration for encoding an array of pixels with three distinct objects arranged in a spatially-interleaved pattern.

FIG. 7 is a portion of a pixel matrix 700 illustrating an example configuration for encoding an array of pixels with three distinct objects arranged in a spatially-interleaved pattern. Such encoding may be used, for example, to simultaneously display multiple objects within an image frame at their proper respective locations. In this example, pixels corresponding to a first object are identified as "C1" followed by two x-y coordinate identifiers (e.g., "C1(0,0)"). Pixels corresponding to a second object are identified as "C2" followed by two x-y coordinate identifiers (e.g., "C2 (0,0)"). Pixels corresponding to a third object are identified as "C3" followed by two x-y coordinate identifiers (e.g., "C3(0,0)"). As shown in FIG. 7, C1(0,0) is shown in the upper lefthand corner of the illustrated array, at a location to the left of C2(0,0) and above C3(0,0). Because only three objects are being displayed by the illustrated array in this example, a black or null pixel is positioned below C2(0,0) and to the right of C3(0,0). Thus, in this example, one respective pixel from each of the three objects may be displayed by a square subarray of four pixels. If a given object is shaped or positioned such that it is not to be displayed at a given pixel location, the respective pixel may be deemed null or black, such that there is no projection for that object at that particular location.

Figure 8:
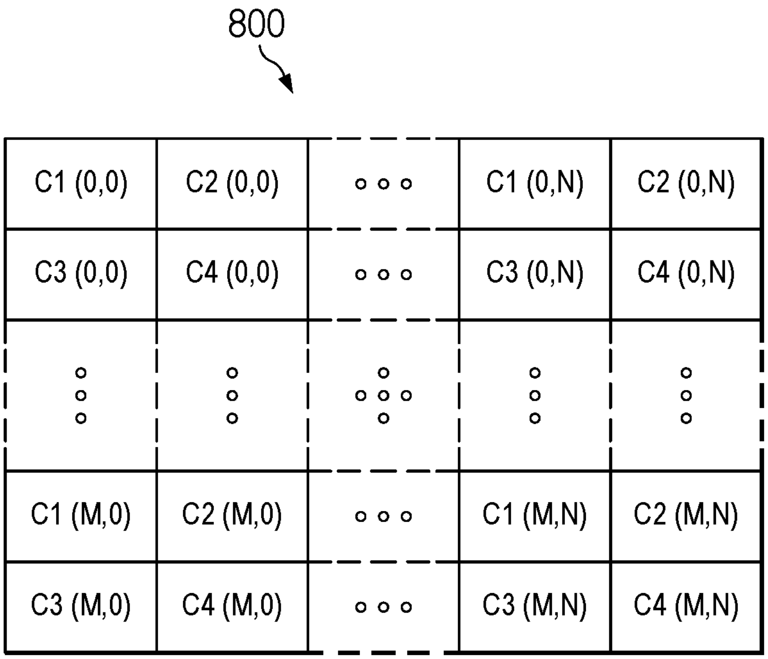
FIG. 8 is a portion of a pixel matrix illustrating an example configuration for encoding an array of pixels with four distinct objects arranged in a spatially-interleaved pattern.

FIG. 8 is a portion of a pixel matrix 800 illustrating an example configuration for encoding an array of pixels with four distinct objects arranged in a spatially-interleaved pattern. Such encoding may be used, for example, to simultaneously display multiple objects within an image frame at their proper respective locations. In this example, pixels corresponding to a first object are identified as "C1" followed by two x-y coordinate identifiers (e.g., "C1(0,0)"). Pixels corresponding to a second object are identified as "C2" followed by two x-y coordinate identifiers (e.g., "C2 (0,0)"). Pixels corresponding to a third object are identified as "C3" followed by two x-y coordinate identifiers (e.g., "C3(0,0)"). Pixels corresponding to a fourth object are identified as "C4" followed by two x-y coordinate identifiers (e.g., "C4(0,0)"). As shown in FIG. 7, C1(0,0) is shown in the upper lefthand corner of the illustrated array, at a location to the left of C2(0,0) and above C3(0,0). A pixel corresponding to the fourth object, C4(0,0), is located beneath C2(0,0) and to the right of C3(0,0). Thus, in this example, one respective pixel from each of the three objects may be displayed by a square subarray of four pixels. If a given object is shaped or positioned such that it is not to be displayed at a given pixel location, the respective pixel may be deemed null or black, such that there is no projection for that object at that particular location.

Figure 9:
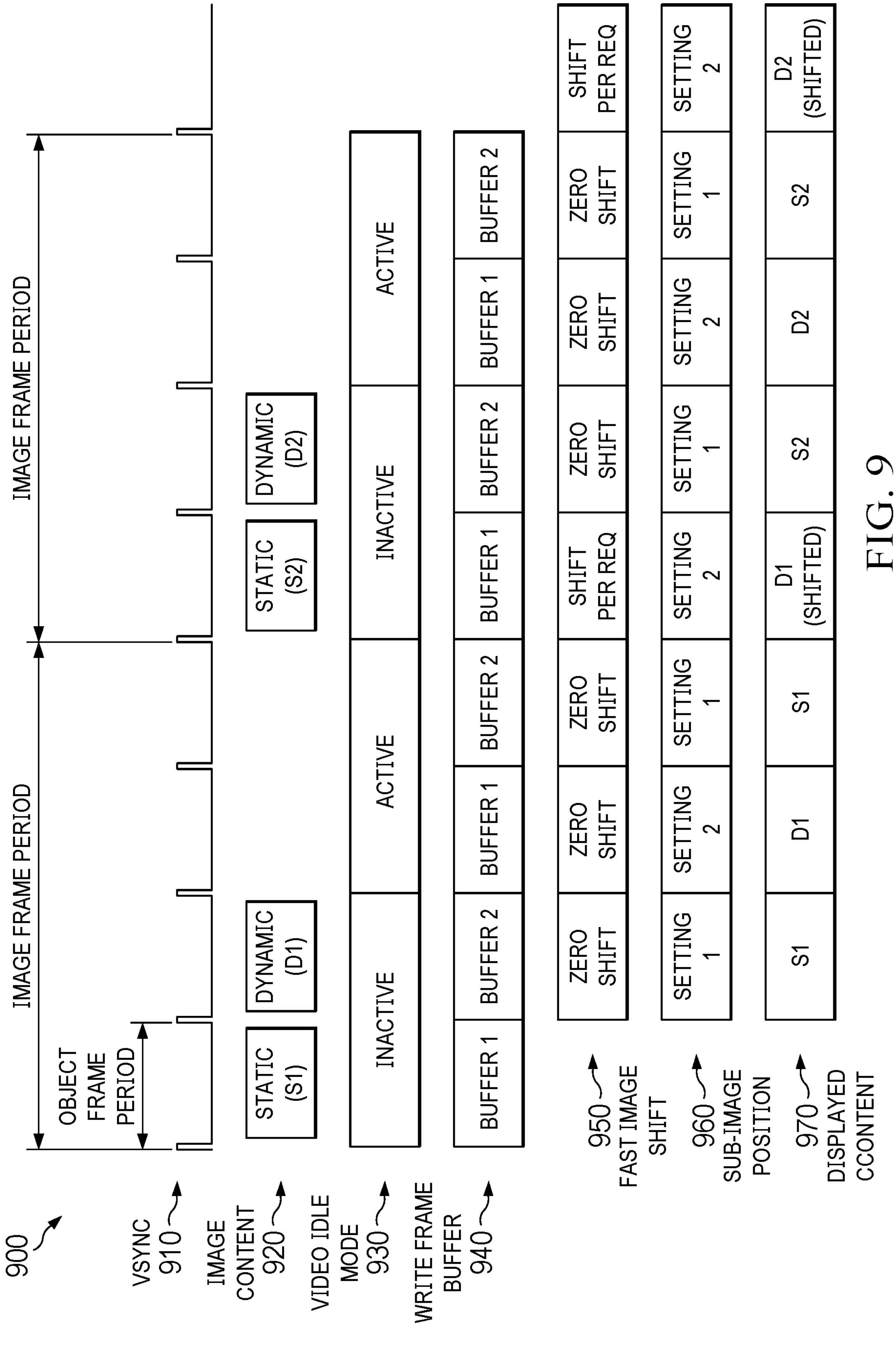
FIG. 9 illustrates a timing scheme that may be used to display image content in a time-multiplexed manner, in which the image content corresponds to one static object and one dynamic object.

FIG. 9 illustrates a timing scheme 900 that may be used by control circuit 110 to sequentially display, in a time-multiplexed manner, image content corresponding to one static object and one dynamic object. In this example, sequential image content corresponding to the single static object is referenced as "S1" and "S2." Sequential image content corresponding to the single dynamic object is referenced as "D1" and "D2." With reference to FIG. 4, for example, S1 may correspond to object 410 and D1 may correspond to object 408. Although this example involves a single dynamic object and a single static object, other examples may involve more or less static or dynamic objects (e.g., two static objects, two dynamic objects, two static objects and one dynamic object, etc.)

In some systems, the motion of dynamic objects may be perceived by the viewer to be smoother and hence more realistic if image frame periods are temporally divided into multiple object frame periods and the shift amount from image frame to image frame is itself subdivided through the use of multiple object frames. Static objects may also be repeatedly displayed a commensurate amount of times during the same image frame period, so as to be perceived by the viewer as having at least the same relative brightness as dynamic objects. Timing scheme 900 illustrates an example of how such temporal subdivision may be accomplished. Specifically, in this example, timing scheme 900 subdivides each image frame period into at least four respective object frame periods.

The top row 910 of timing scheme 900 refers to a vertical sync clock or VSYNC signal, which in some systems is produced by control circuit 110. The VSYNC signal may be used, for example, to initiate (and thereby temporarily differentiate) each image frame in a sequence of multiple images frames. Row 910 further shows how two sequential image frame periods may each be temporally subdivided into respective sequential, nonoverlapping object frame periods.

Row 920 shows that image content corresponding to at least one static object S1 and one dynamic object D1 is obtained during respective object frame periods.

Row 940 shows that the image content for both static object S1 and dynamic object D1 may be written to frame buffers 1 and 2, respectively. Frame buffers 1 and 2 may each be a portion of random-access memory (RAM) containing image content (e.g., a bitmap) that drives a video display. In some systems, frame buffers 1 and 2 may be included within frame memory 350 of control circuit 110. Row 940 further illustrates an example timing scheme for the writing of image content to frame buffers 1 and 2. For example, the image content for static object S1 may be received and written to a frame buffer 1 during a first object frame period; and the image content for dynamic object D1 may be received and written to frame buffer 2 during a second object frame period.

Row 930 indicates that while image content is being received and written, a "video idle mode" may be Inactive. Once the receiving and writing of object frame content is complete for a given image frame, the video idle mode may be switched to Active to indicate that video idle mode has commenced. Because no new video content is obtained while the video idle mode is in an Active state, any power associated with obtaining video may be turned off. Use of the video idle mode may thus provide power savings. While the video idle mode is Inactive, information may be written to frame buffers 1 and 2, as described above with reference to row 940. In addition, certain image shift processing may occur while the video idle mode is inactive, as described further with reference to row 950.

Row 950 indicates that there is zero shift with respect to static object S1 and dynamic object D1 during the second, third, and fourth object frame periods of the first image frame period. During the first object frame period of the second image frame period, however, there will be a shift per requirement (req.) (in terms of a relative position within an image frame) of dynamic object D1. As described with reference to FIG. 3, for example, control circuit 110 may include a sub-image shifter 370 configured to determine whether and the extent to which a positional shift within an image frame should be applied to dynamic object D1. The shift determination may be based, at least in part, on a motion vector determined for dynamic object D1, as explained with reference to FIG. 1. The motion vector may be based on, for example, a movement vector of object D1, any directional change of the gaze of the viewer's pupil(s), or any movement vector of the viewer's head or entire body. Movement of the viewer's head or body may be determined, for example, based on detected movement of control circuit 110. In some systems, a respective movement vector of a projected object may be encoded as part of the video data for object D1 or may be derived by control circuit 110 by comparing positions of a given image in one image frame relative to another.

This is further indicated in row 970 by the reference D1 (shifted) shown in the first object frame period of the second image frame period. This also further indicated in rows 950 and 970 by the last object frame shown, in which row 950 indicates Shift per req. and row 970 indicates D2 (shifted) for the first object frame period of the third image frame period.

Row 960 indicates the timing for two different settings as Setting 1 and Setting 2. In this example, Setting 1 is used for object frames marked as being static and Setting 2 is used for object frames marked as being dynamic.

Row 970 indicates example timing for image content being displayed during the object frame periods of a given image frame period. For example, row 970 shows static object S1 as being displayed twice during the first image frame period. Specifically, static object S1 is displayed during both the second and fourth object frame periods of the first illustrated image frame period. The repeated display of static object S1 during the same image frame period may enable increasing the brightness of static object S1 from a viewer's perspective.

Image content corresponding to the dynamic object is likewise displayed multiple times within a time interval equivalent to an image frame period. For example, the dynamic object is displayed at a shifted position D1 (shifted) relative to position D1 and new image content D2 for the dynamic object is likewise displayed during the third object frame period of the second image frame. In other words, row 970 refers to D1 (shifted) as an intermediate or soothed positional shift of a certain number of pixels between image content of the dynamic object corresponding to D1 and D2. The image content D2 (shifted) (which represents a shift of the D2 image content) will be displayed during the first object frame period of the next image frame shown. With reference to FIG. 5, for example, D1 may correspond to object 408 at its relative position within IMAGE FRAME 1; and D2 may correspond to object 408 at its relative shifted position within IMAGE FRAME 1.5.

Thus, timing scheme 900 provides an example of how to smooth motion of a dynamic object by temporally dividing image frames periods into multiple object frame periods and deriving intraframe shift amounts of the dynamic object from one image frame to another. Timing scheme 900 may be applied, for example, by display formatter 380 of FIG. 3 in order to appropriately time a display output provided to a display panel (e.g., to SLM 120 of FIG. 1).

Row 970 also indicates that image content represented as static object S1 may be displayed while image content represented as dynamic object D1 is received and written. Similarly, row 970 indicates that image content represented as D1 (shifted) may be displayed while image content represented as static object S2 is received and written. In this example, no image content is received or written while the Video idle mode is in an active state.

Figure 10:
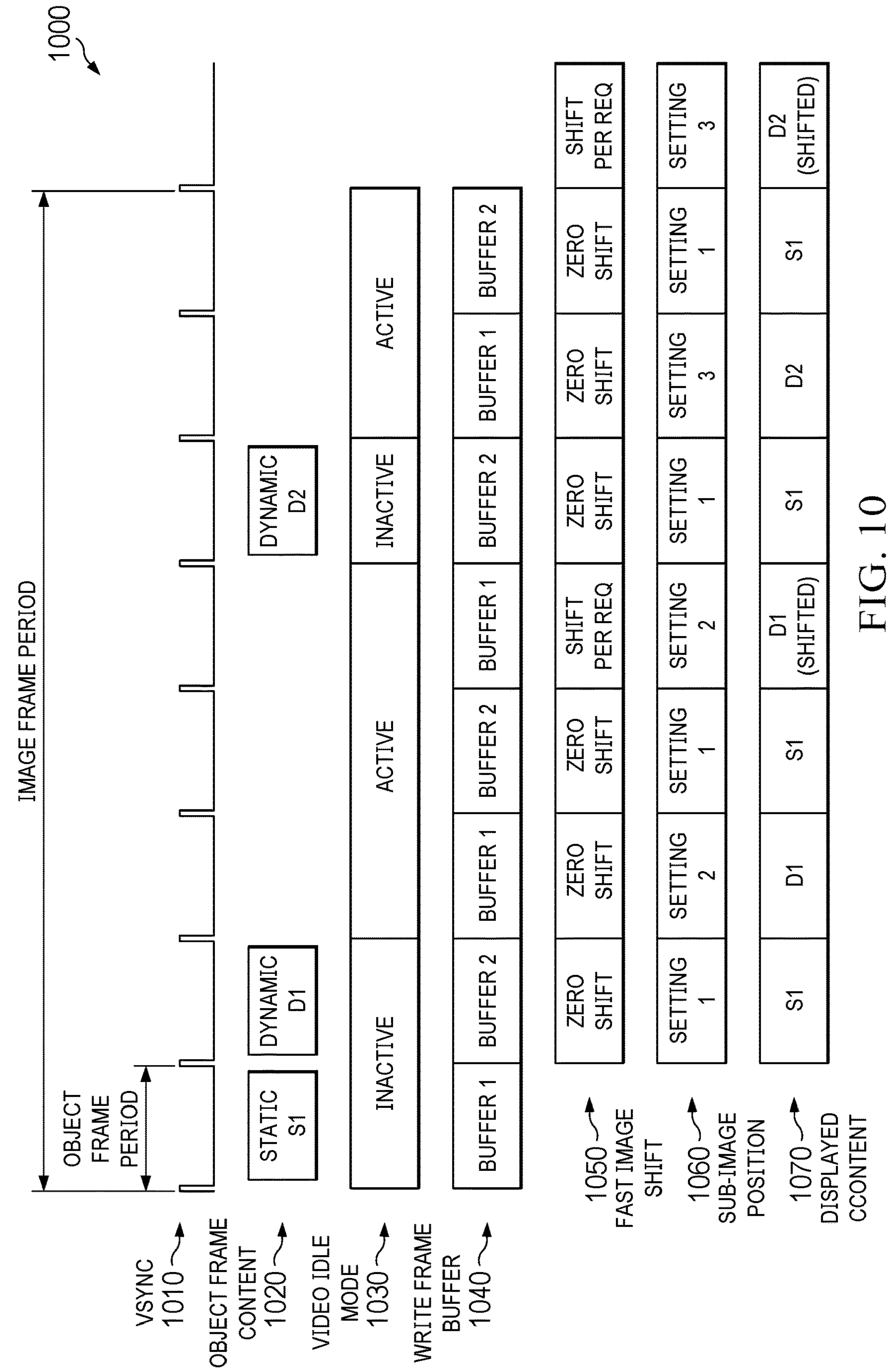
FIG. 10 illustrates a timing scheme that may be used to display image content in a time-multiplexed manner, in which the image content corresponds to one static object and multiple dynamic objects.

FIG. 10 illustrates a timing scheme 1000 that may be used by control circuit 110 to sequentially display, in a time-multiplexed manner, image content corresponding to one static object and one dynamic object. In this example, image content corresponding to the single static object is referenced as S1. Image content corresponding to the two dynamic objects are referenced as D1 and D2. With reference to FIG. 4, for example, S1 may correspond to object 410, D1 may correspond to object 406, and D2 may correspond to object 408. Although this example involves a single static object and two dynamic objects, other examples may involve more or less static or dynamic objects (e.g., two static objects, two dynamic objects, two static objects and one dynamic object, etc.).

In some systems, the motion of dynamic objects may be perceived by the viewer to be smoother and hence more realistic if image frame periods are temporally divided into multiple object frame periods and the shift amount from image frame to image frame is itself subdivided through the use of multiple object frames. Static objects may also be repeatedly displayed a commensurate amount of times during the same image frame period, so as to be perceived by the viewer as having at least the same relative brightness as dynamic objects. Timing scheme 1000 illustrates an example of how such temporal subdivision may be accomplished. Specifically, in this example, timing scheme 1000 subdivides each image frame period into at least eight respective object frame periods.

In this example, timing scheme 1000 subdivides each image frame period into at least eight respective object frame periods. Timing scheme 1000 includes rows 1010, 1020, 1030, 1040, 1050, 1060, 1070 that generally correspond in their respective descriptions to rows 910, 920, 930, 940, 950, 960, 970 of timing scheme 900.

The top row 1010 of timing scheme 1000 refers to a VSYNC signal, which in some systems is produced by control circuit 110. The VSYNC signal may be used, for example, to initiate (and thereby temporarily differentiate) each image frame in a sequence of multiple images frames. Row 1010 further shows that a single image frame period may be temporally subdivided into at least eight sequential, nonoverlapping object frame periods.

Row 1020 shows that image content corresponding to at least one static object S1 and two dynamic objects D1 and D2 is obtained during respective object frame periods.

Row 1040 illustrates an example timing scheme for the writing of image content to frame buffers 1 and 2. In this example, the image content for static object S1 is received and written to a Frame Buffer 1 during a first object frame period; the image content for dynamic object D1 is received and written to Frame Buffer 2 during a second object frame period; and the image content for dynamic object D2 is received and written to Frame Buffer 2 during a sixth object frame period. Frame buffers 1 and 2 may each be a portion of random-access memory (RAM) containing image content (e.g., a bitmap) that drives a video display. In some systems, frame buffers 1 and 2 may be included within frame memory 350 of control circuit 110. Row 1040 further illustrates an example timing scheme for the writing of image content to frame buffers 1 and 2.

Row 1030 indicates that while image content is being received and written, a "video idle mode" may be "Inactive." Once the receiving and writing of object frame content is complete for a given image frame, the video idle mode may be switched to "Active" to indicate that video idle mode has commenced. Because no new video content is obtained while the video idle mode is in an Active state, any power associated with obtaining video may be turned off. Use of the video idle mode may thus provide power savings.

Row 1050 indicates that there is "Zero shift" with respect to the dynamic objects D1 and D2 during the second, third, fourth, sixth, seventh, and eighth object frame periods of the first image frame period. A shift per requirement (e.g., in terms of a relative position within an image frame) may be applied to first and second dynamic objects D1 and D2 during respective object frame periods. As described with reference to FIG. 3, for example, control circuit 110 may include a sub-image shifter 370 configured to determine whether and the extent to which a positional shift within an image frame should be applied to a first dynamic object D1 or to a second dynamic object D2. The shift determination may be based, at least in part, on respective motion vectors determined for dynamic objects D1 and D2, as explained with reference to FIG. 1. The motion vector may be based on, for example, a movement vector of object D1 or D2, any directional change of the gaze of the viewer's pupil(s), or any movement vector of the viewer's head or entire body. Movement of the viewer's head or body may be determined, for example, based on detected movement of control circuit 110. In some systems, a respective movement vector of a projected object may be encoded as part of the video data for object D1 or D2, or may be derived by control circuit 110 by comparing positions of a given image in one image frame relative to another.

As shown in FIG. 10, a shift per requirement may be applied to first dynamic object D1 during the fifth object frame period of the full image frame period shown. Similarly, a "shift per requirement" may be applied to the second dynamic object D2 during the first object frame period of the second image frame period. This is further indicated in row 1070 by the references to D1 (shifted) (shown in the fifth object frame period) and D2 (shifted) shown in the first object frame period of the second image frame period. Thus, the timing scheme shown in FIG. 10 may facilitate the display of the two different dynamic objects as having different respective motion vectors, as described with reference to dynamic objects 404 and 408 of FIG. 4.

Row 1060 indicates the timing for three different settings as "Setting 1," "Setting 2," and "Setting 3." In this example, Setting 1 is used for object frames marked corresponding to static object S1, Setting 2 is used for object frames corresponding to dynamic object D1, and Setting 3 is used for object frames corresponding to dynamic object D2.

Row 1070 indicates example timing for image content being displayed during the object frame periods of a given image frame period. For example, row 1070 shows static object S1 as being displayed four times during the first image frame period. Specifically, static object S1 is displayed during both the second, fourth, sixth and eighth object frame periods of the first illustrated image frame period. The repeated display of static object S1 during the same image frame period may enable increasing the brightness of static object S1 from a viewer's perspective.

Image content corresponding to the two dynamic objects D1 and D2 is likewise displayed multiple times within a time interval equivalent to an image frame period. During the first image frame period, for example, dynamic object D1 is displayed during the third object frame period, a shifted intraframe position of dynamic object D1 is displayed during a fifth object frame period. Dynamic object D2 is displayed during the seventh object frame period; and a shifted intraframe position of dynamic object D2 is displayed during the first object frame period of the next image frame. Thus, in this example, dynamic objects D1 and D2 are both displayed at least twice within a time interval equivalent to an image frame period (i.e., the time interval inclusively extending from the second object frame period of the first image frame period to the second object frame period of the second image frame period).

Timing scheme 1000 provides an example of how to smooth motion of multiple dynamic objects by temporally dividing image frames periods into multiple object frame periods and deriving object-level intraframe shift amounts of multiple dynamic objects from one image frame to another. Timing scheme 1000 may be applied, for example, by display formatter 380 of FIG. 3 in order to appropriately time a display output provided to a display panel (e.g., to SLM 120 of FIG. 1).

In this example, row 1070 shows static object S1 as being displayed four times during the first image frame period, while dynamic objects D1 and D2 are each displayed twice during an equivalent timeframe. The result of applying such a timing scheme 100 may be that static object S1 appears to the viewer to be twice as bright as dynamic objects D1 and D2. The brightness of static object S1 can be reduced to better match the relative brightness of dynamic objects D1 and D2. For example, the amount of time that static object S1 is displayed may be reduced by half relative to what is shown in row 1070. Alternatively, the pixel intensity level may by reduce by half, such that static object S1 is displayed for the full objects frame periods shown in row 1070, but the pixel intensity level is digitally reduced by half.

Row 1070 also indicates that image content represented as static object S1 may be displayed while image content for dynamic object D1 is received and written. Similarly, row 1070 indicates that image content represented as S1 be displayed (a third time) while image content represented as dynamic D2 is received and written. In this example, no image content is received or written while the "Video idle mode" is in an active state.

Figure 11:
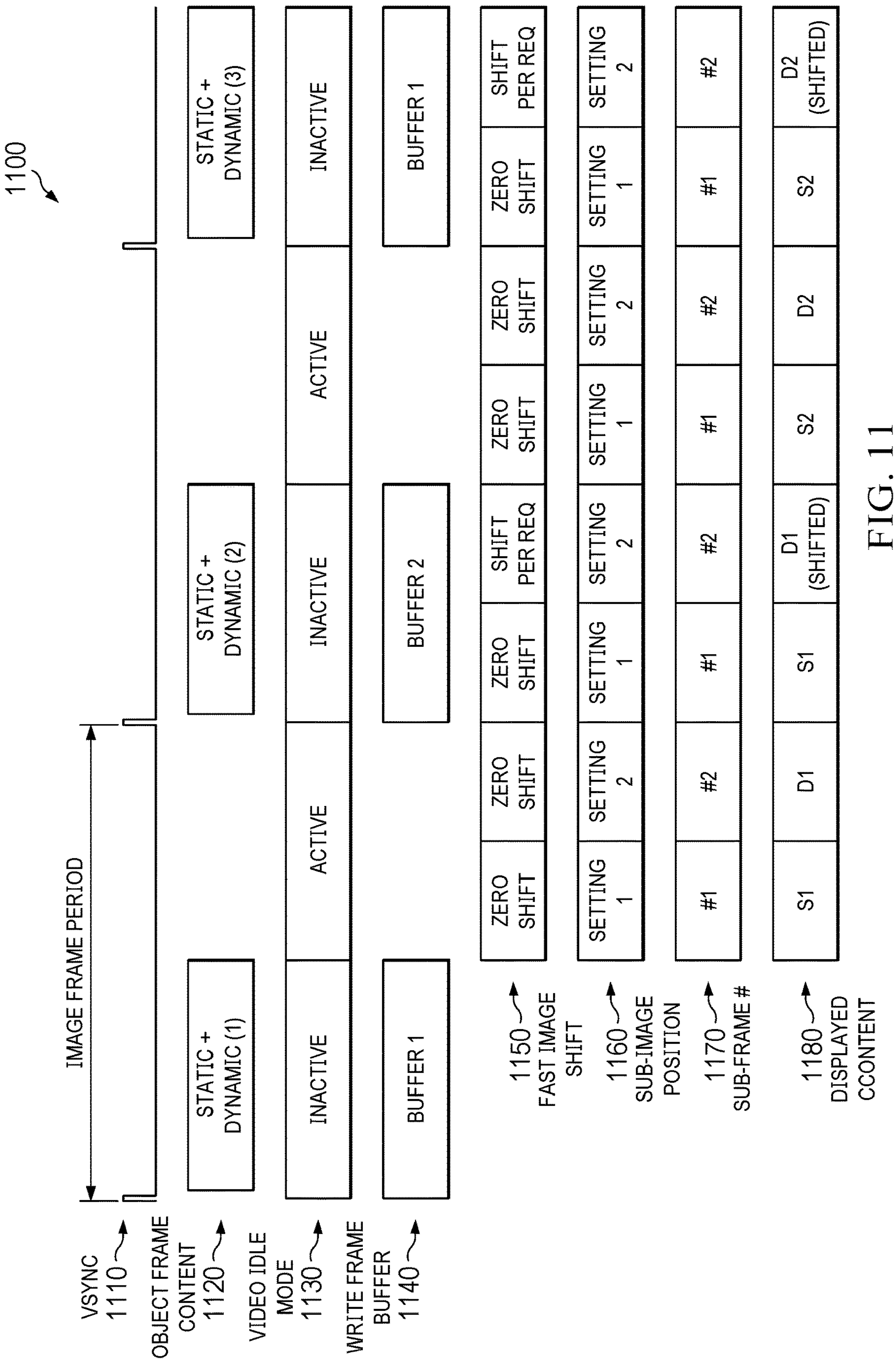
FIG. 11 illustrates a timing scheme that may be used to process spatially-interleaved image content corresponding to at least one static object and one dynamic object.

FIG. 11 illustrates a timing scheme 1100 that may be used by control circuit 110 to process spatially-interleaved image content corresponding to at least one static object and one dynamic object. In this example, sequential image content corresponding to the single static object is referenced as S1 and S2, where S1 and S2 each correspond to different respective positions within an image frame for the same static object. Image content corresponding to the single dynamic object is referenced as D1, D1(shifted), D2, and D2(shifted), where D1, D1(shifted), D2, and D2(shifted)

each correspond to different respective positions within an image frame for the same dynamic object. With reference to FIG. 4, for example, the static object (positionally represented by S1 and S2) may correspond to object 410; and the dynamic object (positionally represented by D1, D1(shifted), D2, and D2 (shifted)) may correspond to object 408. Although this example involves a single dynamic object and a single static object, other examples may involve more or less static or dynamic objects (e.g., two static objects, two dynamic objects, two static objects and one dynamic object, etc.).

In some systems, the motion of dynamic objects may be perceived by the viewer to be smoother and hence more realistic if image frame periods are temporally divided into multiple object frame periods and the shift amount from image frame to image frame is itself subdivided through the use of multiple object frames. Static objects may also be repeatedly displayed a commensurate amount of times during the same image frame period, so as to be perceived by the viewer as having at least the same relative brightness as dynamic objects. Timing scheme 1100 illustrates an example of how such temporal subdivision may be accomplished. Specifically, in this example, timing scheme 1100 subdivides each image frame period into at least four respective object frame periods.

The top row 1110 of timing scheme 1100 refers to a vertical sync clock or VSYNC signal, which in some systems is produced by control circuit 110. The VSYNC signal may be used, for example, to initiate (and thereby temporarily differentiate) each image frame in a sequence of multiple images frames. Row 1110 further indicates, relative to the remainder of FIG. 11, that the ratio of image frame period to object frame period is 1:4 in this example.

Row 1120 shows that image content corresponding to at least one static object (S1) and at least one dynamic object (D1) is obtained during the same first and second object frame periods.

Row 1140 shows that the image content for both a single static object (e.g., S1) and for multiple dynamic objects (e.g., D1 and D2) may be written to one or more frame buffers, such as, for example, one or more of frame buffers 1 or 2. Frame buffers 1 and 2 may each be a portion of random-access memory (RAM) containing image content (e.g., a bitmap) that drives a video display. In some systems, frame buffers 1 and 2 may be included within frame memory 350 of control circuit 110.

Row 1140 further illustrates an example timing scheme for the writing of image content to frame buffers 1 and 2. For example, the image content for static object S1 and dynamic object D1 may be received and written to a frame buffer 1 during first and second object frame periods of an image frame period; and the image content for static object S1 and dynamic object D1(shifted) may be received and written to frame buffer 2 during first and second object frame periods of a subsequent image frame period.

Row 1130 indicates that while object frame content is being received and written, a "video idle mode" may be "Inactive." Once the receiving and writing of object frame content is complete for a given image frame, the video idle mode may be switched to "Active" to indicate that video idle mode has commenced. Because no new video content is obtained while the video idle mode is in an Active state, any power associated with obtaining video may be turned off. Use of the video idle mode may thus provide power savings. While the video idle mode is Inactive, information may be written to frame buffers 1 and 2, as described above with reference to row 1140. In addition, certain image shift processing may occur while the video idle mode is Inactive, as described further with reference to row 1150.

Row 1150 indicates that there is "Zero shift" with respect to static object S1 and dynamic object D1 during the third and fourth object frame periods of the first image frame period and during the first object frame period of the second image frame period. A "shift per requirement" (e.g., in terms of a relative position within an image frame) may be applied to first and second dynamic objects D1 and D2 during respective object frame periods. As described with reference to FIG. 3, for example, control circuit 110 may include a sub-image shifter 370 configured to determine whether and the extent to which a positional shift within an image frame should be applied to a first dynamic object D1 or to a second dynamic object D2. The shift determination may be based, at least in part, on respective motion vectors determined for dynamic objects D1 and D2, as explained with reference to FIG. 1. The motion vector may be based on, for example, a movement vector of object D1 or D2, any directional change of the gaze of the viewer's pupil(s), or any movement vector of the viewer's head or entire body. Movement of the viewer's head or body may be determined, for example, based on detected movement of control circuit 110. In some systems, a respective movement vector of a projected object may be encoded as part of the video data for object D1 or D2, or may be derived by control circuit 110 by comparing positions of a given image in one image frame relative to another.

As shown in row 1150, a "shift per requirement (in terms of relative position within an image frame) may be applied to dynamic object D1 during the second object frame period of the second image frame period. The positional shifting of dynamic object D1 is further indicated in row 1180 by the reference D1(shifted) shown in the second object frame period of the second image frame period. Similarly, a shift per requirement (in terms of relative position within an image frame) may be applied to dynamic object D2 during the second object frame period of the third image frame period shown. The positional shifting of dynamic object D2 is further indicated in rows 1150 and 1170 by the last object frame shown, in which row 1150 indicates "Shift per req." and row 1170 indicates "D2(shifted)" for the second object frame period of the third image frame period.

Row 1160 indicates the timing for two different settings as setting 1 and setting 2. In this example, setting 1 is used for object frames marked as being static and Setting 2 is used for object frames marked as being dynamic.

Row 1170 indicates example timing for image content being displayed during the object frame periods of a given image frame period. For example, row 1170 shows static object S1 as being displayed once during the third object frame period of the first image frame period and once during the first object frame of the second image frame period. Row 1170 further shows dynamic object D1 as being displayed in the fourth object frame of the first image frame period. The dynamic object D1 is displayed at a shifted position D1(shifted) relative to position D1 in the second object frame period of the second image frame. With reference to FIG. 5, for example, D1 may correspond to object 408 at its relative position within IMAGE FRAME 1; and D1(shifted) may correspond to object 408 at its relative shifted position within IMAGE FRAME 1.5. In other words, row 1170 refers to D1(shifted) as an intermediate or soothed positional shift of a certain number of pixels between image content of the dynamic object corresponding to D1. A shift of the image content D2, shown as D2(shifted), will be displayed during the second object frame period of the next image frame shown. With reference to FIG. 5, for example, D2 may correspond to object 406 at its relative position within IMAGE FRAME 1; and D2(shifted) may correspond to object 406 at its relative shifted position within IMAGE FRAME 1.5.

Thus, timing scheme 1100 provides an example of how to smooth motion of a dynamic object by temporally dividing image frames periods into multiple object frame periods and deriving intraframe shift amounts of the dynamic object from one image frame to another. Timing scheme 1100 may be applied, for example, by display formatter 380 of FIG. 3 in order to appropriately time a display output provided to a display panel (e.g., to SLM 120 of FIG. 1).

In some systems, the respective display times of the static and dynamic objects may occur during respective, mutually exclusive object frames, as shown in row 1170 of FIG. 11. In some alternative systems, however, the displayed content corresponding to the third and fourth object frames of the first image frame showed may be displayed simultaneously for the full duration of both the third and fourth object frames. When employing such an alternative timing scheme, the pixel data for static object S1 may be spatially-interleaved with the pixel data for dynamic object D1 (e.g., in a manner similar to what is described herein with reference to FIG. 6).

Figure 12:
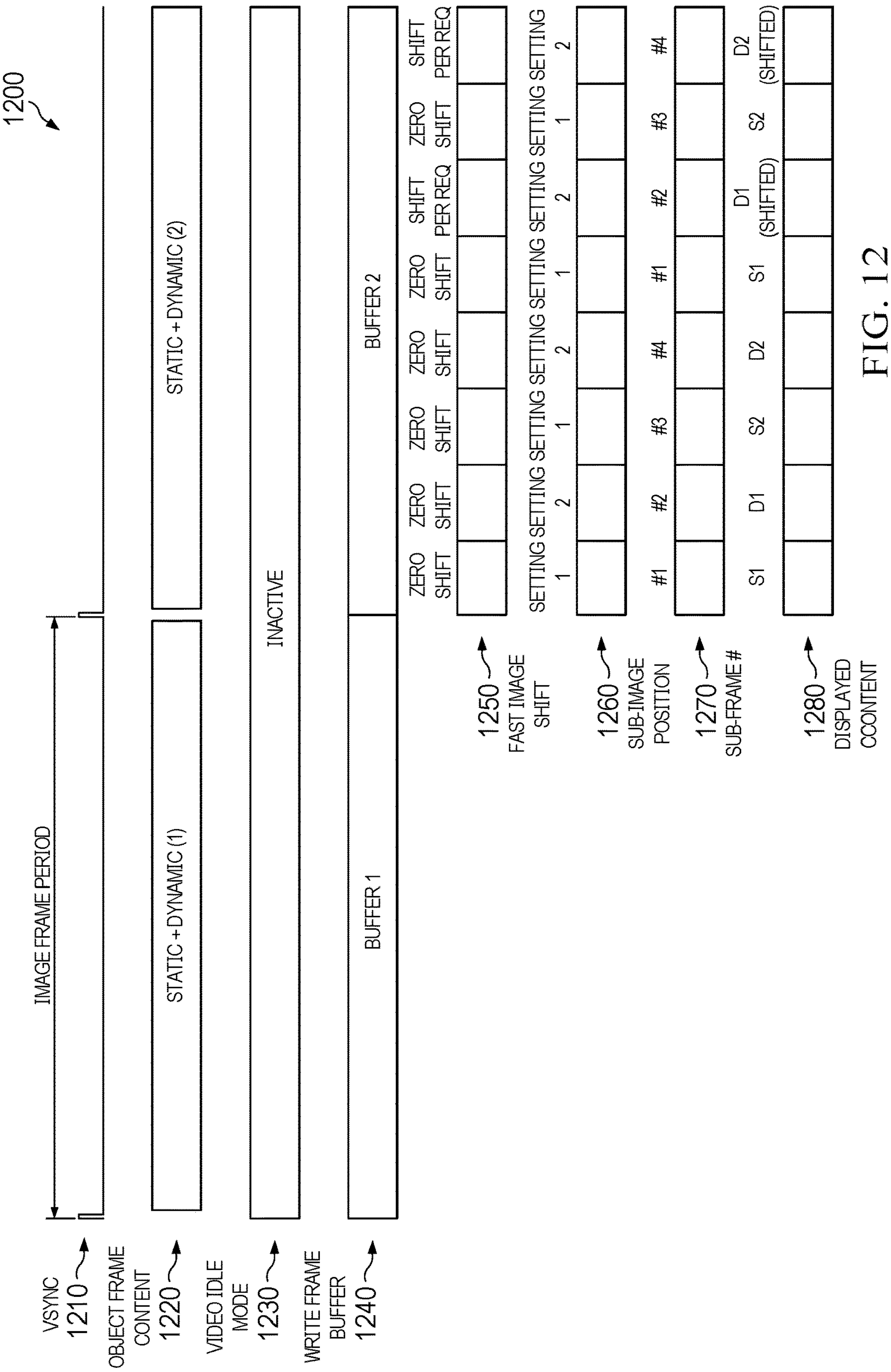
FIG. 12 illustrates a timing scheme that may be used to process spatially-interleaved image content corresponding to at least two static objects and two dynamic objects.

FIG. 12 illustrates a timing scheme 1200 that may be used by control circuit 110 to process spatially-interleaved image content corresponding to multiple static and multiple dynamic objects. In this example, image content corresponding to a first and second static objects is referenced in row 1280 as S1 and S2, respectively. In the same row 1280, image content corresponding to a first dynamic object is referenced as D1 and D1(shifted), the latter being positionally shifted from the former by at least a distance corresponding to a derived number of pixels. Image content corresponding to a second dynamic object is referenced as D2 and D2(shifted), the latter being positionally shifted from the former by at least a distance corresponding to a derived number of pixels a derived number of pixels. With reference to FIG. 4, for example, S1 may correspond to object 410, D1 may correspond to object 406, and D2 may correspond to object 408. Although this example involves a single static object (S1) and to dynamic objects (D1 and D2), other examples may involve more or less static or dynamic objects (e.g., two static objects, one dynamic objects, two static objects and three dynamic objects, etc.).

In some systems, the motion of dynamic objects (e.g., D1 and D2) may be perceived by the viewer to be smoother and hence more realistic if image frame periods are temporally divided into multiple object frame periods and the shift amount from image frame to image frame is itself subdivided through the use of multiple object frames. Static objects (e.g., S1) may also be repeatedly displayed a commensurate amount of times during the same image frame period, so as to be perceived by the viewer as having at least the same relative brightness as dynamic objects. Timing scheme 1200 illustrates an example of how such temporal subdivision may be accomplished. Specifically, in this example, timing scheme 1200 subdivides each image frame period into at least eight respective object frame periods.

The top row 1210 of timing scheme 1200 refers to a vertical sync clock or VSYNC signal, which in some systems is produced by control circuit 110. The VSYNC signal may be used, for example, to initiate (and thereby temporarily differentiate) each image frame in a sequence of multiple images frames. Row 1210 also provides an example of how two sequential image frame periods may each be temporally subdivided into respective sequential, nonoverlapping object frame periods. While this example uses a 8:1 ratio of object frame periods per image frame period, any suitable ratio may be used.

Row 1220 shows that virtual image content corresponding to static object S1 and dynamic object D1 may be obtained during a first image frame period and that virtual image content corresponding to static object S2 and dynamic object D2 may be obtained during a second image frame period.

Row 1240 shows that the image content for the respective image content for static object S1 and dynamic object D1 may be written to a first buffer 1 during a first image frame period; and respective image content for static object S2 and dynamic object D2 may be written to a second buffer 2 during the second image frame period. Frame buffers 1 and 2 may each be a portion of random-access memory (RAM) containing image content (e.g., a bitmap) that drives a video display. In some systems, frame buffers 1 and 2 may be included within frame memory 350 of control circuit 110.

Row 1230 indicates that while image content is being received and written, a video idle mode may be inactive. Once the receiving and writing of object frame content is complete for a given image frame, the video idle mode may be switched to active to indicate that video idle mode has commenced. Because no new video content is obtained while the video idle mode is in an Active state, any power associated with obtaining video may be turned off. Use of the video idle mode may thus provide power savings. While the video idle mode is Inactive, information may be written to frame buffers 1 and 2, as described above with reference to row 1240. In addition, certain image shift processing may occur while the video idle mode is Inactive, as described further with reference to row 1250.

Row 1250 indicates that there is “Zero shift” for first, second, third, fourth, fifth, and seventh object frame periods of the second image frame period. A “shift per requirement” (e.g., in terms of a relative position within an image frame) may be applied to first and second dynamic objects D1 and D2 during respective object frame periods. As described with reference to FIG. 3, for example, control circuit 110 may include a sub-image shifter 370 configured to determine whether and the extent to which a positional shift within an image frame should be applied to a first dynamic object D1 or to a second dynamic object D2. The shift determination may be based, at least in part, on respective motion vectors determined for dynamic objects D1 and D2, as explained with reference to FIG. 1. The motion vector may be based on, for example, a movement vector of object D1 or D2, any directional change of the gaze of the viewer’s pupil(s), or any movement vector of the viewer’s head or entire body. Movement of the viewer’s head or body may be determined, for example, based on detected movement of control circuit 110. In some systems, a respective movement vector of a projected object may be encoded as part of the video data for object D1 or D2, or may be derived by control circuit 110 by comparing positions of a given image in one image frame relative to another.

Various processing may occur during the first image frame period (which may continue during the second image frame period) to determine whether and the extent to which any positional shifting of a dynamic object should be implemented. In this example, the first image frame period shown in FIG. 12 corresponds to the very first image content being displayed at power up and, consequently, may not have any shifting or displaying taking place within the same image frame period. As shown in the second image frame period, however, every image frame period that follows the first will at least include processing steps implementing positional shifting of dynamic objects, as per any determined shift requirement(s).

As shown in FIG. 12, a "shift per requirement" may be applied to first dynamic object D1 during the sixth object frame period of the second image frame period. The positional shifting of dynamic object D1 is further indicated in row 1280 by the reference D1(shifted) shown in the sixth object frame period of the second image frame period. Similarly, a "shift per requirement (in terms of relative position within an image frame) may be applied to dynamic object D2 during the eight object frame period of the second image frame period shown. The positional shifting of dynamic object D2 is further indicated in row 1280 by the reference D2(shifted) shown in the eighth object frame period of the second image frame period. Thus, the timing scheme shown in FIG. 12 may facilitate the display of the two different dynamic objects as having different respective motion vectors, as described with reference to dynamic objects 406 and 408 of FIG. 4.

Row 1260 indicates the timing for two different settings as "Setting 1" and "Setting 2." In this example, Setting 1 is used for object frames marked as being static and Setting 2 is used for object frames marked as being dynamic. Row 1270 indicates example subframe numbering that may be used to reference specific object frames.

Row 1280 indicates example timing for image content being displayed during the object frame periods of a given image frame period. For example, row 1280 shows static object S1 as being displayed twice during the second image frame period: once during the first object frame period and once during fifth object frame period. Row 1280 further shows static object S2 as also being displayed twice during the second image frame period: once during the third object frame period and once during the seventh object frame period. Row 1280 further shows dynamic object D1 and D1 (shifted) being displayed during second and sixth object frame periods, respectively, of the second image frame period. Row 1280 also shows dynamic object D2 and D2(shifted) being displayed during fourth and eighth object frame periods of the second image frame period.

Thus, timing scheme 1200 provides an example of how to smooth motion of a dynamic object by temporally dividing image frames periods into multiple object frame periods and deriving intraframe shift amounts of the dynamic object from one image frame to another. Timing scheme 1200 may be applied, for example, by display formatter 380 of FIG. 3 in order to appropriately time a display output provided to a display panel (e.g., to SLM 120 of FIG. 1).

In some systems, the respective display times of the two static and two dynamic objects may occur during respective, mutually exclusive object frames, as shown in row 1280 of FIG. 12. In some alternative systems, however, image content corresponding to objects S1, D1, S2, and D2 may be displayed simultaneously during the first half of the second image frame period (i.e., during object frame periods 1-4); and image content corresponding to objects S1, D1(shifted), S2, and D2(shifted) may be displayed simultaneously during the second half of the second image frame period (i.e., during object frame periods 5-8). When employing such an alternative timing scheme, the pixel data corresponding to objects S1, D1, S2, and D2 may be spatially-interleaved together (e.g., as shown in FIG. 8) during the first half of the second image frame period; and the pixel data corresponding to objects S1, D1(shifted), S2, and D2(shifted) may be spatially-interleaved together (e.g., as shown in FIG. 8) during the second half of the second image frame period.

Figure 13:
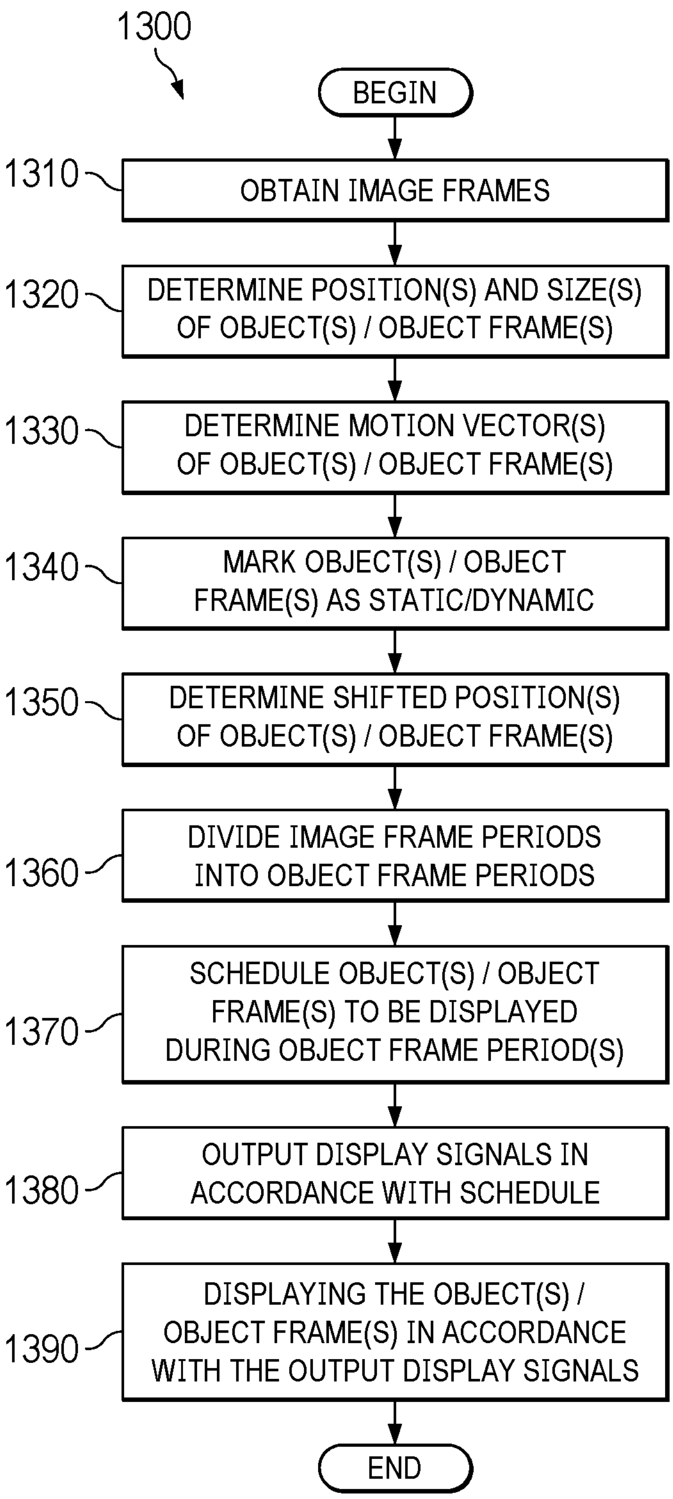
FIG. 13 is a flowchart illustrating examples processing for performing adaptative intraframe image shifting in display systems.

FIG. 13 is a flowchart 1300 illustrating examples processing for performing adaptative intraframe image shift in display systems. In some systems, the steps 1310-1380 of flowchart 1300 may be performed by control circuit 110.

Step 1310 includes control circuit 110 obtaining image frames. In some systems, control circuit 110 may include an image processor 320 configured to analyze video input received from video receiver 310 to derive a plurality of corresponding image frames, as explained herein with reference to FIG. 3.

Step 1320 includes control circuit 110 determining the position(s) and size(s) of object(s) or object frame(s) within each image frame. In some systems, control circuit 110 may include a sub-image splitter 330 configured to determine the dimensions and locations of one or more object frames within a given image frame, with each object frame encompassing a respective virtual object, as explained further herein with reference to FIGS. 3-4.

Step 1330 includes control circuit 110 determining the motion vector(s) of object(s) or object frame(s). As explained with reference to FIG. 1, control circuit 110 may adaptively determine respective motion vectors for various virtual objects to be projected within a given image frame. The motion vectors may be based on, for example, respective movement vectors of the projected objects themselves, any directional change of the gaze of the viewer's pupil(s), or any movement vector of the viewer's head or entire body. Movement of the viewer's head or body may be determined, for example, based on detected movement of control circuit 110. In some systems, a respective movement vector of a projected object may be encoded as part of the video data or may be derived by control circuit 110 by comparing positions of a given image in one image frame relative to another.

Step 1340 includes control circuit 110 marking object(s) or object frame(s) as static or dynamic. The marking of object(s) or object frame(s) as being static or dynamic may be based on the motion vector(s) determined in step 1330. As explained with reference to FIGS. 1 and 4, for example, a virtual object having a motion vector other than zero relative may be marked as "dynamic," while all other motion vectors may be marked as being "static."

Step 1350 includes control circuit 110 determining any shifted position(s) of object(s). For example, control circuit 110 may include a sub-image shifter 370 configured to control the position shifting of sub-images to be displayed, as explained further herein with reference to FIGS. 1, 3, 5, and 9.

Step 1360 includes control circuit 110 dividing image frame periods into object frame periods. The dividing may include, for example, the control circuit dividing a first image frame period into a certain number of object frame periods and further dividing a second image frame period into a corresponding number of object frame periods.

In some systems, each object frame of an image frame is allotted the same amount of time for a given image frame period. Such a timing scheme may facilitate calculating a frame rate for displaying content of object frames, in which the frame rate is represented as the number of object frames per image frame divided by the amount of time allotted per image frame. A maximum frame rate that may be used may be determined, for example, based on the amount of image content included within an object frame. As explained herein with reference to FIG. 4, larger object frames having more image content may have a reduced maximum frame rate relative to smaller object frames having less image content. The object frame size may itself be adaptively determined, as explained herein with reference to FIG. 4, by control circuit 110 analyzing virtual objects within an image frame and determining the smallest rectangle (e.g., in terms of total pixel count) sufficient to enclose the largest virtual object within the image frame.

Step 1370 includes control circuit 110 scheduling object(s) or object frame(s) to be displayed during respective object frame period(s). Various timing schemes may be used in scheduling object(s) or object frame(s) to be displayed. Example timing schemes are described above with reference to FIGS. 9, 10, 11 and 12. In some systems, each object or object frame may be uniquely assigned a respect object frame period. In some systems, multiple objects may be assigned the same object frame period for being displayed. Where multiple objects are assigned the same object frame period for being displayed, the objects may be displayed in a spatially-interleaved manner, as described herein with reference to FIGS. 6-8.

While any control circuit 110 may apply any suitable schedule, in some systems, the schedule may be configured for displaying a given object in the following order: (1) the object or object frame is displayed in accordance with a first position within a first image frame; (2) sometime later the object or object frame is displayed in accordance with a second position that is derived by control circuit 110, based on a motion vector of the object, as a shifted position relative to the first position; and (3) sometime later the object or object frame is displayed in accordance with a third position within a second image frame subsequent to the first image frame, wherein the shifted second position of the object is somewhere between the first position and the third position.

In certain instances, an object or object frame may be scheduled for display, at different positions, at least twice during respective object frame periods of the same image frame period. For example, a first display may be in accordance with a first position of the object or object frame within a first image frame; and a second display may be in accordance with a second position that is shifted relative to the first position and that is derived by control circuit 110. A specific example of such a timing scheme is described further herein with respect to FIG. 10, in which at least one dynamic object D1 is scheduled to be displayed twice during the same image frame period, with the second display being positionally shifted relative to the first.

In certain instances, an object or object frame may be scheduled for display at a first position and at derived shifted position, with the first position scheduled to be displayed during a first image frame period and the derived shifted position scheduled to be displayed during a second image frame period subsequent to the first image frame period. An example of such a timing scheme is described further herein with respect to FIG. 10, in which at least one dynamic object D2 is scheduled to be displayed once during a first image frame period, at a position that accords with content of the first image frame. The derived shifted position for dynamic object D2—referenced in FIG. 10 as D2(shifted)—is scheduled to be subsequently displayed during the first object frame period of the next image frame. FIG. 9 also illustrates a timing scheme in which dynamic object A' is scheduled to be displayed during a third object frame of a first image frame, at a position that accords with image content of the first image frame. A derived shifted position of dynamic object A'—referenced in FIG. 9 as A'(shifted)—is scheduled to be subsequently displayed during a first object frame period of the next image frame.

Step 1380 includes control circuit 110 outputting display signals configured to control the display of object(s) or object frame(s) in accordance with the schedule determined in step 1370. In some systems, control circuit 110 may include a display formatter 380 configured to produce an output formatted to be applied to input interfaces of by SLM 120, as explained further with reference to FIG. 3.

Step 1390 includes displaying the object(s) or object frame(s) in accordance with the output display signals outputted by the control circuit in step 1380. In some systems, the display signals outputted by control circuit 110 may be provided to the projection subsystem 100 of FIG. 1 and may be configured to control, for example, the spatial light modulation of SLM 120 to spatially modulate light beams in a manner that visually renders the display of the aforementioned object(s) or object frame(s).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. To aid the Patent Office, and any readers of any patent issued on this application, in interpreting the claims appended hereto, applicant notes that there is no intention that any of the appended claims invoke paragraph 6 of 35 U.S.C. § 112 as it exists on the date of filing hereof unless the words "means for" or "step for" are explicitly used in the claim language.

In the foregoing descriptions, for purposes of explanation, numerous specific details are set forth to provide a thorough understanding of one or more examples. However, this disclosure may be practiced without some or all these specific details, as will be evident to one having ordinary skill in the art. In other instances, well-known process steps or structures have not been described in detail in order not to unnecessarily obscure this disclosure. In addition, while the disclosure is described in conjunction with example examples, this description is not intended to limit the disclosure to the described examples. To the contrary, the description is intended to cover alternatives, modifications, and equivalents as may be included within the spirit and scope of the disclosure as defined by the appended claims.

What is claimed is:

1. A method, comprising:

obtaining, by a control circuit, first and second image frames, the first image frame having first image content to be displayed during a first image frame period and the second image frame having second image content to be displayed during a second image frame period occurring after the first image frame period;

determining, by the control circuit, a plurality of objects included within the first image content of the first image frame;

determining, by the control circuit, a plurality of object frames, in which a respective object frame encompasses a respective object of the plurality of objects;

dividing, by the control circuit, the first image frame period into a plurality of object frame periods based on the plurality of object frames;

determining, by the control circuit, a motion vector for a first object of the plurality of objects;

determining, by the control circuit, based on the motion vector, a shift amount of the first object in each of the plurality of object frame periods, wherein the shift amount of the first object in one of the plurality of object frame periods is different than the shift amount of the first object in another of the plurality of object frame periods to determine positions of the first object in the first image frame; and outputting, by the control circuit, output signals configured to control displaying the plurality of objects in the plurality of object frame periods, in which at least one of the plurality of objects is displayed in two different object frame periods of the plurality of object frame periods.

2. The method of claim 1, wherein the plurality of object frame periods is a first plurality of object frame periods, the method further comprising:

dividing, by the control circuit, the second image frame period into a second plurality of object frame periods.

3. The method of claim 2, wherein the output signals are further configured to control the display of the first object at different positions during different object frame periods of the first plurality of object frame periods.

4. The method of claim 2, wherein the output signals are further configured to control the display of the first object at a first position during a respective one of the first plurality of object frame periods and at a second position during a respective one of the second plurality of object frame periods.

5. The method of claim 2, wherein the plurality of objects is a first plurality of objects, and the method further comprises determining, by the control circuit, a second plurality of objects included within the second image content of the second image frame, and the output signals are further configured to control display of the second plurality of objects in the second plurality of object frame periods.

6. The method of claim 1, wherein:

the determining, by the control circuit, the plurality of object frames includes determining an object frame sufficient to encompass a largest of the plurality of objects; the method further comprising:

determining, by the control circuit, an equal duration of time to be applied to each object frame period of the plurality of object frame periods based on a total area encompassed by the object frame of the largest of the plurality of objects.

7. The method of claim 1, wherein the output signals are further configured to control the display the first object while displaying a second object of the plurality of objects, the first and second objects having respective pixels that are displayed in a spatially-interleaved pattern.

8. A system comprising:

a video receiver configured to receive video input;

a control circuit coupled to the video receiver, the control circuit configured to:

obtain first and second image frames from the video input, the first image frame having first image content to be displayed during a first image frame period and the second image frame having second image content to be displayed during a second image frame period occurring after the first image frame period;

determine a plurality of objects included within the first image content of the first image frame;

determine a plurality of object frames, in which a respective object frame encompasses a respective object of the plurality of objects;

divide the first image frame period into a plurality of object frame periods based on the plurality of object frames;

determine a motion vector for a first object of the plurality of objects;

determine, based on the motion vector, a shift amount of the first object in each of the plurality of object frame periods, wherein the shift amount of the first object in one of the plurality of object frame periods is different than the shift amount of the first object in another of the plurality of object frame periods to determine positions of the first object in the first image frame; and output display signals configured to control the display of the plurality of objects in the plurality of object frame periods, in which at least one of the plurality of objects is displayed in two different object frame periods of the plurality of object frame periods; and a spatial light modulator coupled to the control circuit, the spatial light modulator configured to spatially modulate a light beam responsive to the display signals outputted by the control circuit.

9. The system of claim 8, wherein the plurality of object frame periods is a first plurality of object frame periods, and the control circuit is further configured to:

divide the second image frame period into a second plurality of object frame periods.

10. The system of claim 9, wherein the display signals are further configured to control the display of the first object at different positions during different object frame periods of the first plurality of object frame periods.

11. The system of claim 9, wherein the plurality of objects is a first plurality of objects, the control circuit is further configured to determine a second plurality of objects included within the second image content of the second image frame, and the display signals are further configured to control the display of the second plurality of objects in the second plurality of object frame periods.

12. The system of claim 11, wherein the display signals are further configured to control sequential display of the second plurality of objects included within the second image frame, each object of the second plurality of objects to be displayed in a respective one of the second object frame periods.

13. The system of claim 8, wherein the control circuit is further configured to:

determine the plurality of object frames by determining dimensions of an object frame sufficient to encompass a largest of the plurality of objects; and determine an equal duration of time to be applied to each object frame period of the plurality of object frame periods based on the determined dimensions of the object frame encompassing the largest of the plurality of objects.

14. The system of claim 8, wherein the display signals are further configured to control the display of the first object while displaying a second object of the plurality of objects, the first and second objects having respective pixels that are displayed in a spatially-interleaved pattern.

15. A method, comprising:

obtaining, by a control circuit, first and second image frames, the first image frame having first image content to be displayed during a first image frame period and the second image frame having second image content to be displayed during a second image frame period occurring after the first image frame period;

determining, by the control circuit, a plurality of objects included within the first image content;

determining, by the control circuit, a plurality of object frames for the plurality of objects, respectively;

identifying, by the control circuit, each of the plurality of objects as one of static and dynamic, wherein a first object of the plurality of objects is identified as dynamic;

determining, by the control circuit, a motion vector for the first object;

determining, by the control circuit, based on the motion vector, a shift amount of the first object in each of the plurality of object frames, wherein the shift amount of the first object in one of the plurality of object frames is different than the shift amount of the first object in another of the plurality of object frames to determine positions of the first object in the first image frame;

determining, by the control circuit, a dimension of an object frame encompassing a largest object of the plurality of objects included within the first image content of the first image frame; and outputting, by the control circuit, a sequence of display signals configured to control the display of a dynamic object of the plurality of objects at a first position during the first image frame period and at a second position during the second image frame period.

16. The method of claim 15, further comprising dividing, by the control circuit, the first image frame period into a plurality of object frame periods, wherein the display signals are further configured to control the display of a static object of the plurality of objects during a first object frame period of the plurality of object frame periods and to control the display of the static object during a second object frame period of the plurality of object frame periods.

17. The method of claim 15, further comprising:

dividing, by the control circuit, the first image frame period into a first plurality of object frame periods; and dividing, by the control circuit, the second image frame period into a second plurality of object frame periods, wherein the display signals are further configured to control the display of the dynamic object at the first position during a first object frame period of the first plurality of object frame periods and to control the display of the dynamic object at the second position during a second object frame period of the second plurality of object frame periods.

18. The method of claim 15, further comprising dividing, by the control circuit, the first image frame period into a first plurality of object frame periods, the dividing based on based on the determined dimension of the object frame.

19. The method of claim 15, wherein the motion vector is determined based on detected pupil movement.

20. The method of claim 19, wherein the control circuit is used to detect pupil movement.

* * * * *